(12) United States Patent
Takahashi

(10) Patent No.: US 7,832,947 B2
(45) Date of Patent: Nov. 16, 2010

(54) DRIVING MECHANISM

(75) Inventor: Hiroshi Takahashi, Yokohama (JP)

(73) Assignees: Kabushiki Kaisha Toshiba, Tokyo (JP);
Toshiba Tec Kabushiki Kaisha, Tokyo (JP)

(*) Notice: Subject to any disclaimer, the term of this patent is extended or adjusted under 35 U.S.C. 154(b) by 186 days.

(21) Appl. No.: 12/051,099

(22) Filed: Mar. 19, 2008

(65) Prior Publication Data
US 2008/0240704 A1 Oct. 2, 2008

(30) Foreign Application Priority Data
Mar. 28, 2007 (JP) ............................. 2007-084276

(51) Int. Cl.
*G03B 17/00* (2006.01)
*H02N 2/02* (2006.01)

(52) U.S. Cl. ...................... 396/428; 359/824; 310/311; 396/55; 396/325

(58) Field of Classification Search ................. 359/824; 396/419, 427–428; 310/311, 329
See application file for complete search history.

(56) References Cited

U.S. PATENT DOCUMENTS

| | | | | |
|---|---|---|---|---|
| 5,678,099 | A * | 10/1997 | Kato et al. | .................... 396/427 |
| 6,078,440 | A * | 6/2000 | Ueyama | ...................... 359/824 |
| 2001/0017665 | A1* | 8/2001 | Ackermann et al. | ......... 348/374 |
| 2004/0190863 | A1* | 9/2004 | Nishimura et al. | ............ 386/46 |
| 2008/0238249 | A1 | 10/2008 | Takahashi et al. | |

FOREIGN PATENT DOCUMENTS

| | | |
|---|---|---|
| JP | 62-228392 | 10/1987 |
| JP | 63-137306 | 6/1988 |
| JP | 04-145877 | 5/1992 |
| JP | 05296227 A * | 11/1993 |
| JP | 11018459 A * | 1/1999 |
| JP | 11-271480 | 10/1999 |
| JP | 2000-102271 | 4/2000 |
| JP | 2001-211676 | 8/2001 |
| JP | 2003070272 A * | 3/2003 |
| JP | 2004-350413 | 12/2004 |
| JP | 2005-195767 | 7/2005 |
| JP | 2007135270 A * | 5/2007 |

OTHER PUBLICATIONS

Taniguchi, et al., Proceedings of JSPE (The Japan Society for Precision Engineering) Semestrial Meeting, S62 JSPE Spring Meeting (in Japanese) F36, 1987 p. 499-p. 500.

(Continued)

*Primary Examiner*—Melissa J Koval
*Assistant Examiner*—Leon W Rhodes
(74) *Attorney, Agent, or Firm*—Turocy & Watson, LLP

(57) ABSTRACT

A driving mechanism includes a driven member partially having a spherical surface, piezoelectric units that support the driven member between them and drive the driven member, and a base that holds the piezoelectric units. Each of the piezoelectric units includes a driving portion having a flat surface in contact with the spherical surface of the driven member, a first piezoelectric element that moves the driving portion along a first axis parallel to the flat surface, a second piezoelectric element that moves the driving portion along a second axis that is parallel to the flat surface and intersects the first axis, and a support member that supports the driving portion through the first and second piezoelectric elements.

15 Claims, 18 Drawing Sheets

OTHER PUBLICATIONS

Furutani, et al., Journal of the Japan Society for Precision Engineering, Contributed Papers (in Japanese), vol. 65, No. 10, 1999, p. 1445-p. 1449.

Japanese Office Action dated Jan. 13, 2009 corresponding to U.S. Appl. No. 12/051,099, filed Mar. 19, 2008.

* cited by examiner

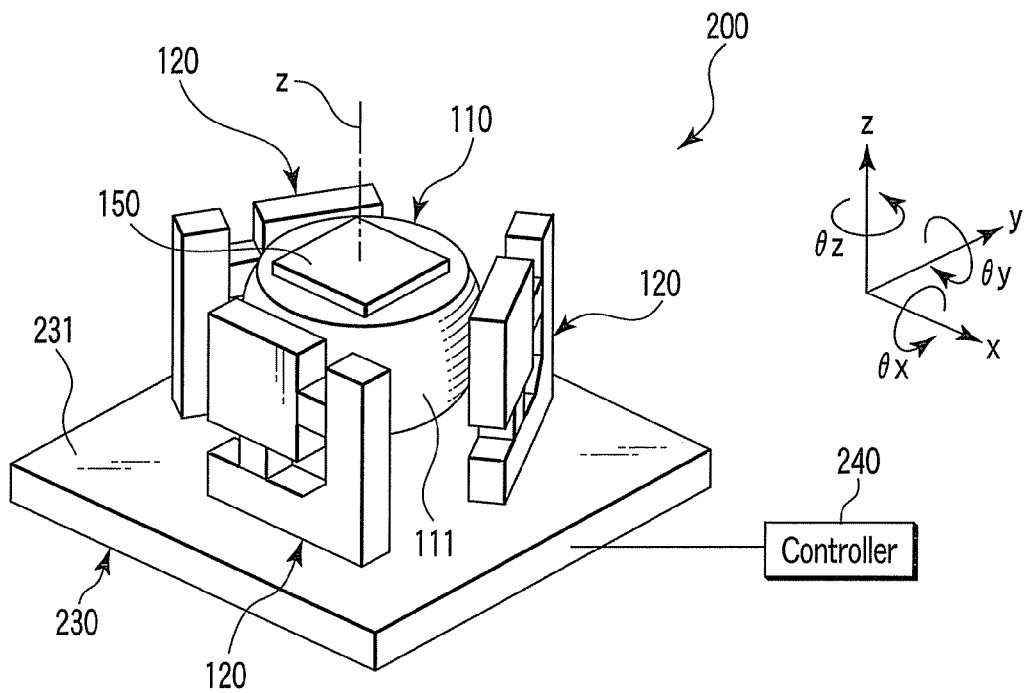
F I G. 7
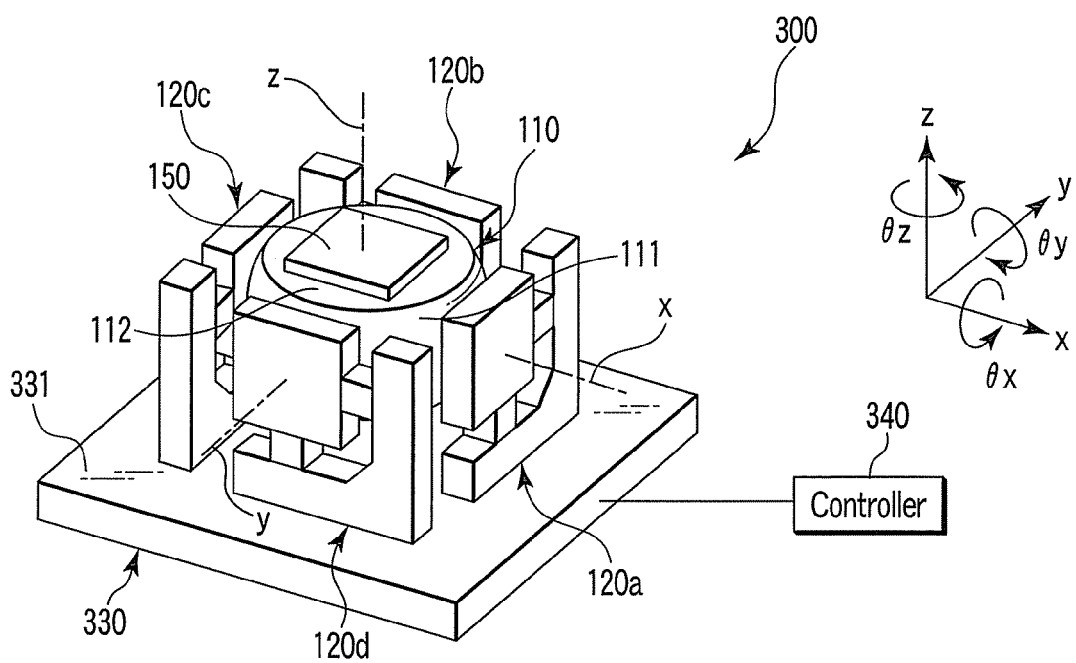
F I G. 8

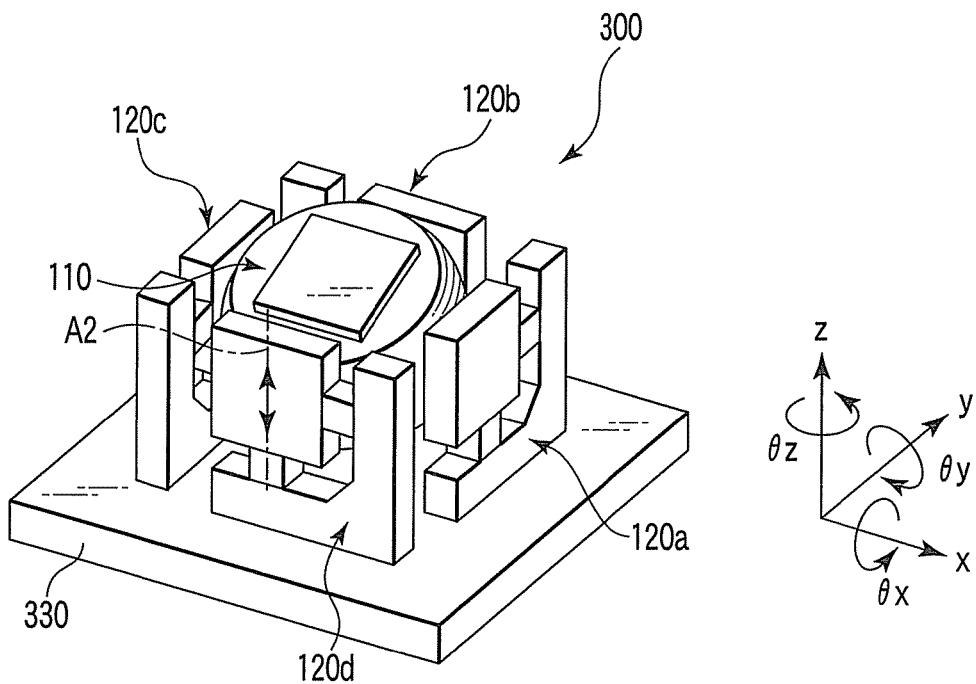
F I G. 11
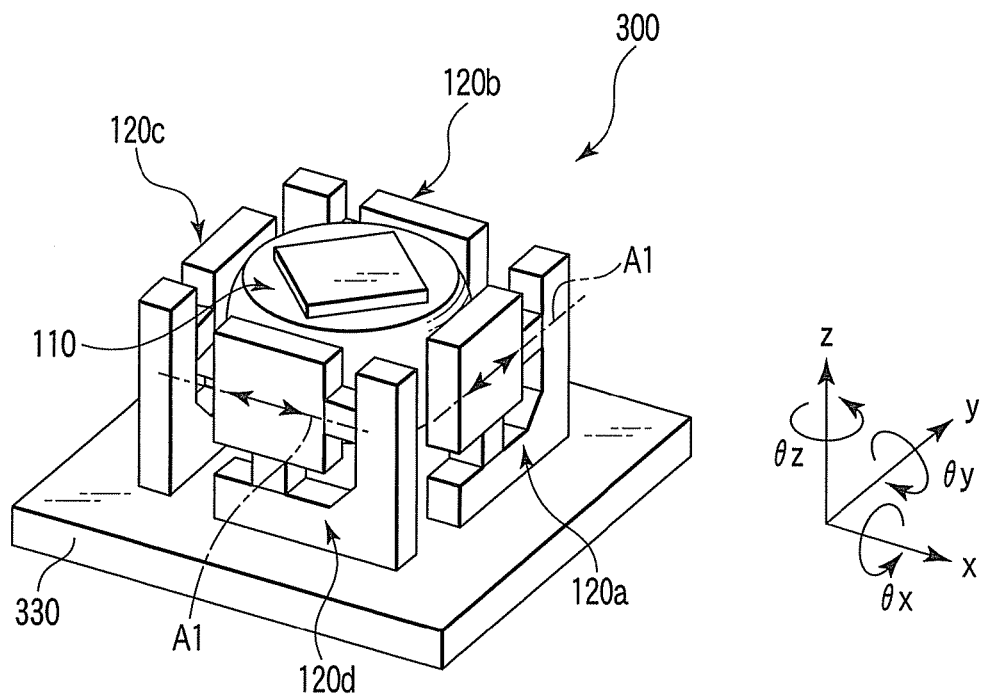
F I G. 12

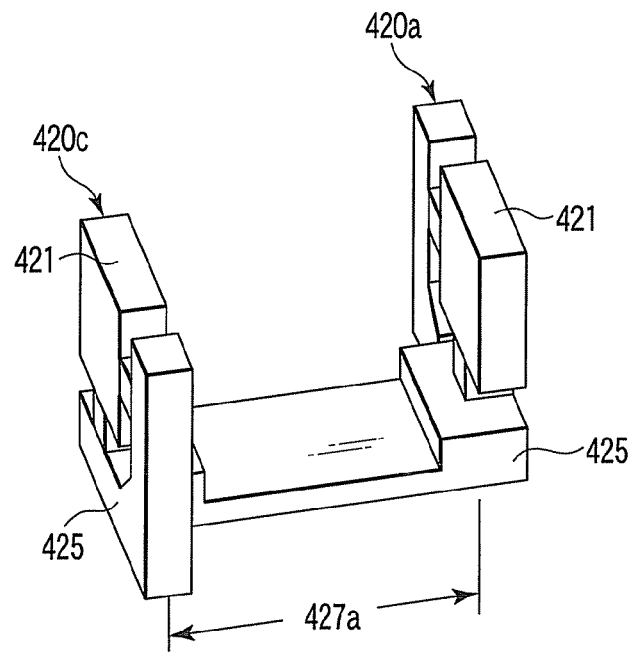
F I G. 15
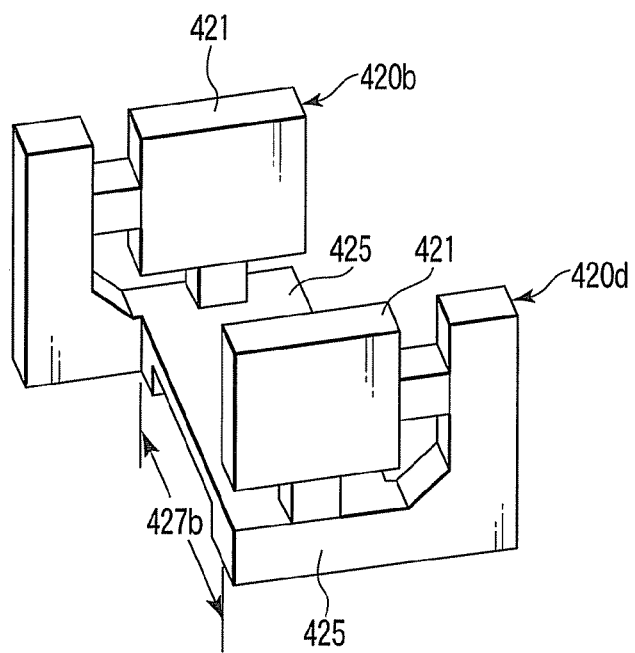
F I G. 16

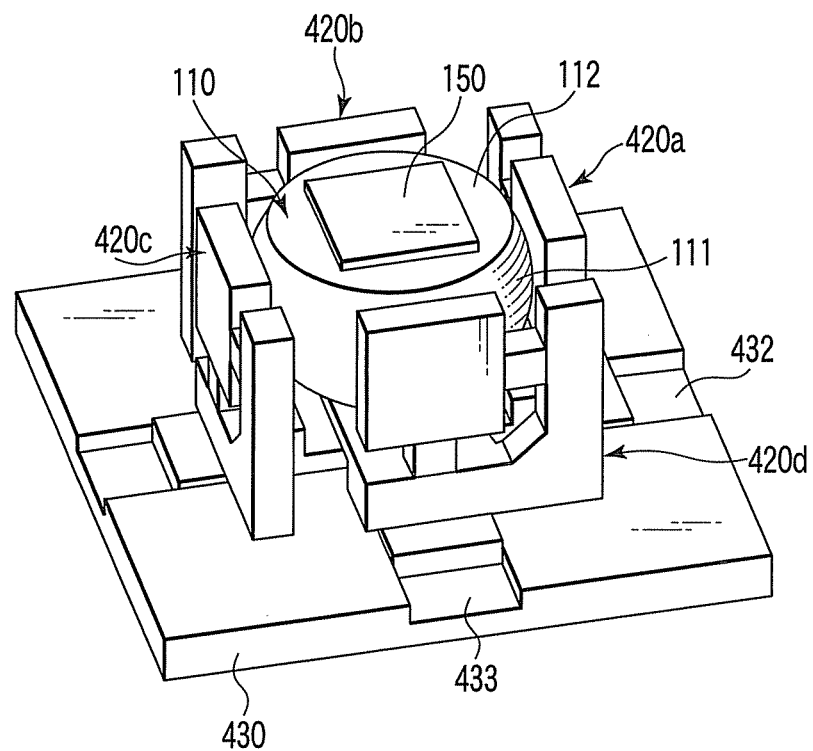
F I G. 17
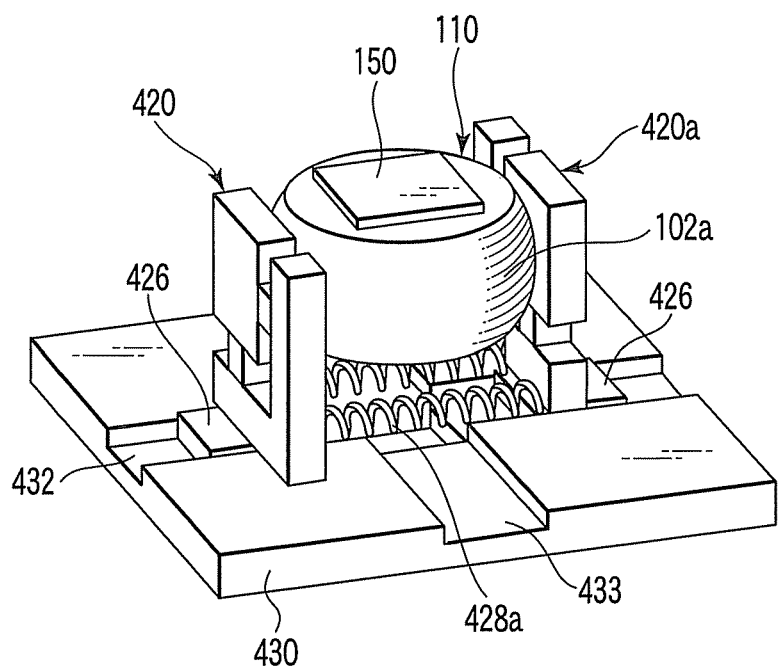
F I G. 18

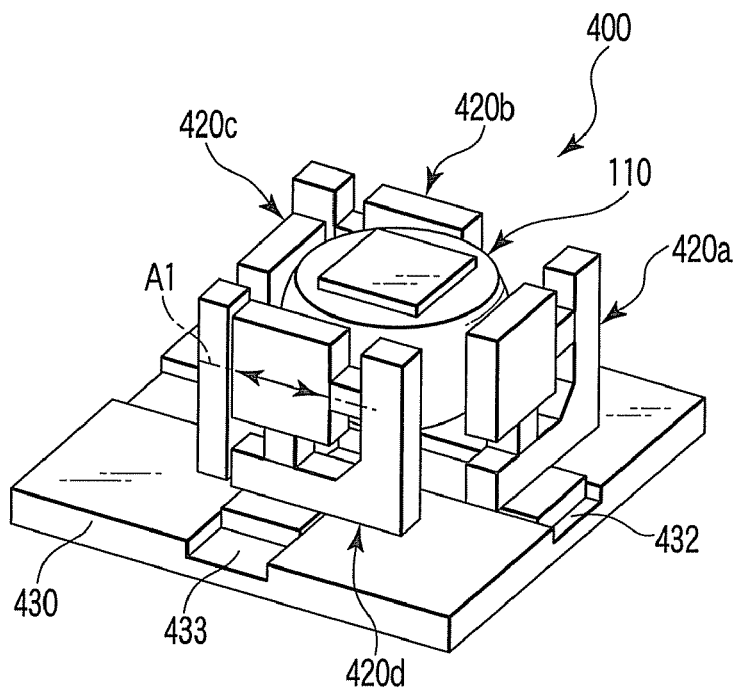
F I G. 21
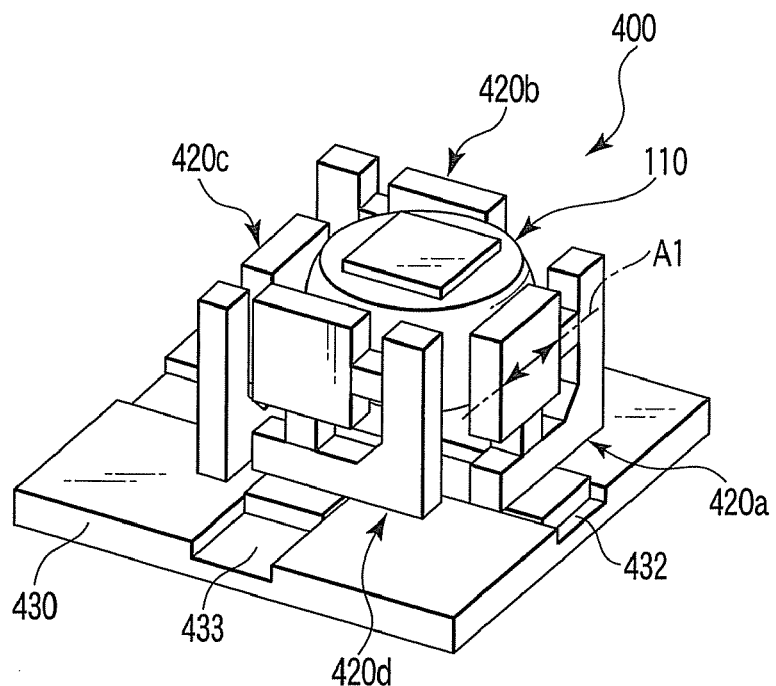
F I G. 22

DRIVING MECHANISM

CROSS-REFERENCE TO RELATED APPLICATIONS

This application is based upon and claims the benefit of priority from prior Japanese Patent Application No. 2007-084276, filed Mar. 28, 2007, the entire contents of which are incorporated herein by reference.

BACKGROUND OF THE INVENTION

1. Field of the Invention

The present invention relates to a driving mechanism that drives a driven member by using piezoelectric elements.

2. Description of the Related Art

In the field of multi-degree-of-freedom control systems represented by six-degree-of-freedom positioning mechanisms used for visual line change control on surveillance cameras and the like and for semiconductor manufacturing apparatuses, a driving mechanism or motor system having an arrangement in which single-axis driving motors are connected in series and stacked on each other has been widely used. Recently, in particular, attention has been paid to research and development of a mechanism that can perform multi-degree-of-freedom driving at high speed with high accuracy by using piezoelectric elements for a driving source in consideration of reductions in size and weight and an increase in accuracy. As support structures for conventional typical mechanisms of this type, there have been proposed a structure using a parallel plate and a radiation plate (JP-A 63-137306 (KOKAI)), a structure using an elastic hinge (the Proceedings of the Japan Society for Precision Engineering Spring Conference (1987)), pp. 499-500), and a structure using a parallel mechanism (Journal of the Japan Society for Precision Engineering Vol. 65 No. 10 (1999), pp. 1445-1449).

However, each of these conventional structures has the following problems and is not necessarily satisfactory. (A) The arrangement in which single-axis actuators are connected in series and stacked on each other makes it difficult to achieve a further increase in speed (a decrease in rigidity) and a further decrease in size. (B) Because of large axis interference, it is difficult to simplify a controller and increase its speed and accuracy. (C) The range of movement is narrow, and hence versatility is low. The conventional structure using the parallel plate and the radiation plate has a limited range of application because of problems (A) and (C) described above in particular. The structure using the elastic hinge and the structure using the parallel mechanism have limited ranges of application mainly because of problems (B) and (C) described above.

BRIEF SUMMARY OF THE INVENTION

A driving mechanism according to an embodiment includes a driven member partially having a spherical surface, piezoelectric units that support the driven member between them and drive the driven member, and a base that holds the piezoelectric units. Each of the piezoelectric units includes a driving portion having a flat surface in contact with the spherical surface of the driven member, a first piezoelectric element that moves the driving portion along a first axis parallel to the flat surface, a second piezoelectric element that moves the driving portion along a second axis that is parallel to the flat surface and intersects the first axis, and a support member that supports the driving portion through the first and the second piezoelectric elements.

BRIEF DESCRIPTION OF THE SEVERAL VIEWS OF THE DRAWING

FIG. 7 is a perspective view of a driving mechanism according to the second embodiment;

FIG. 8 is a perspective view of a driving mechanism according to the third embodiment;

FIG. 11 is a perspective view showing a state wherein the driven member is rotationally moved about the x-axis in the driving mechanism in FIG. 8;

FIG. 12 is a perspective view showing a state wherein the driven member is rotationally moved about the z-axis in the driving mechanism in FIG. 8;

FIG. 15 is an enlarged perspective view of a first unit group used in the driving mechanism in FIG. 13;

FIG. 16 is an enlarged perspective view of a second unit group used in the driving mechanism in FIG. 13;

FIG. 17 is a perspective view of a driving mechanism assembled by using the unit groups in FIGS. 15 and 16;

FIG. 18 is a perspective view showing another first unit group used in the driving mechanism in FIG. 13;

FIG. 21 is a view showing a state wherein a driven member is linearly moved along the x-axis in the driving mechanism in FIG. 13;

FIG. 22 is a view showing a state wherein the driven member is linearly moved along the y-axis after being linearly moved in FIG. 21 in the driving mechanism in FIG. 13;

DETAILED DESCRIPTION OF THE INVENTION

First Embodiment

The arrangement of a driving mechanism according to this embodiment will be described with reference to FIGS. 1 and 2.

Figure 1:
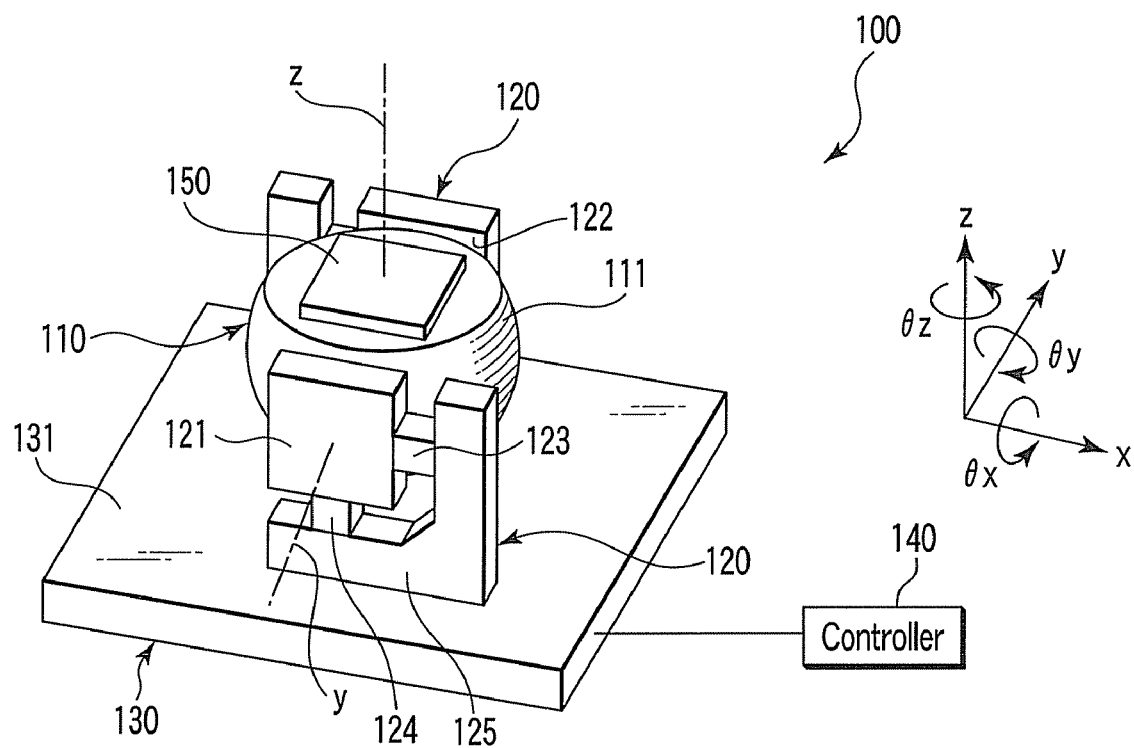
FIG. 1 is a perspective view of a driving mechanism according to the first embodiment.

As shown in FIG. 1, a driving mechanism 100 of this embodiment includes a driven member 110 partially having a spherical surface 111, two piezoelectric units 120 that support the driving mechanism 100 between them and drive it, a base 130 that holds the piezoelectric units 120, and a controller 140 that controls the piezoelectric units 120.

Figure 2:
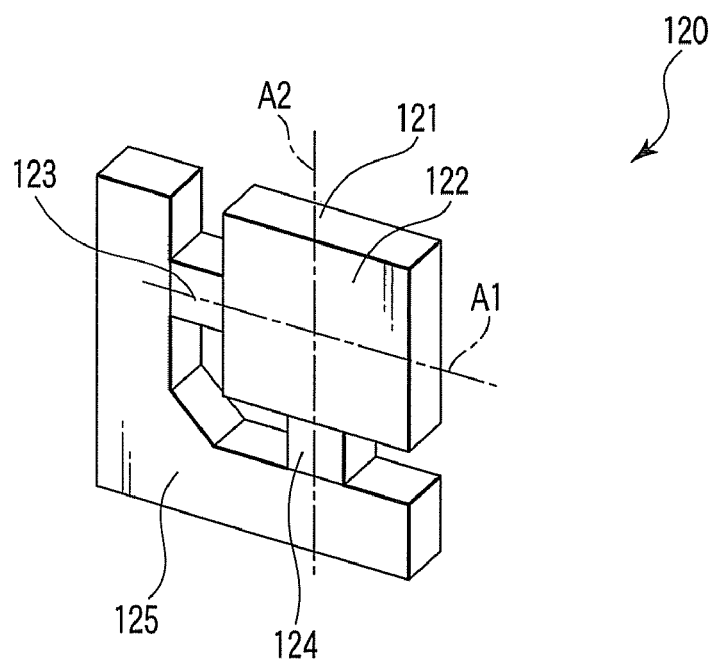
FIG. 2 is an enlarged perspective view of a piezoelectric unit in FIG. 1.

As shown in FIG. 2, each of the piezoelectric units 120 includes a driving portion 121 having a flat surface 122 in contact with the spherical surface 111 of the driven member 110, a first piezoelectric element 123 that linearly moves the driving portion 121 along a first axis A1 parallel to the flat surface 122, a second piezoelectric element 124 that linearly moves the driving portion 121 along a second axis A2 parallel to the flat surface 122 and perpendicular to the axis A1, and a support member 125 that supports the driving portion 121 through the piezoelectric elements 123 and 124. The piezoelectric element 123 extends along the axis A1 and has an end coupled to the driving portion 121 and the other end coupled to the support member 125. The piezoelectric element 124 extends along the axis A2 and has an end coupled to the driving portion 121 and the other end coupled to the support member 125.

The base 130 has a flat surface 131 on which the piezoelectric units 120 are placed. In the following description, as shown in FIG. 1, an xyz orthogonal coordinate system is set so that the x- and y-axes are parallel to the flat surface 131, and the z-axis is perpendicular to the flat surface 131. The θx-, θy-, and θz-axes are set around the x-, y-, and z-axes, respectively. Assume that the positive direction of the θx-axis is the clockwise direction in the +x direction. That is, the rotating direction of a right-handed screw that is turned to move forward in the +x direction is the positive direction of the θx-axis. This also applies to the θy- and θz-axes. Each of piezoelectric units 120 is placed on the base 130 so that the axis A1 is parallel to the x-axis, and the axis A2 is parallel to the z-axis. The axis A1 is parallel to the flat surface 131 of the base 130, and the axis A2 is perpendicular to the flat surface 131 of the base 130.

The two piezoelectric units 120 are arranged so that the driving portions 121 face each other through the driven member 110, and the flat surfaces 122 of the driving portions 121 are parallel to each other. The two piezoelectric units 120 are arranged symmetrically around the z-axis. That is, the two piezoelectric units 120 are arranged around the z-axis at 180° with respect to each other. In addition, the support members 125 are fixed on the base 130 so that the distance between the driving portions 121 is slightly smaller than the diameter of the spherical surface 111. The driven member 110 is supported by the elastic deformation of the piezoelectric units 120. A target object 150 such as a camera module is mounted on the driven member 110.

The operation of the driving mechanism 100 will be described with reference to FIGS. 3 to 6.

In the driving mechanism 100, the controller 140 actuates the piezoelectric elements 123 and 124 so as to cause the driving portions 121 to perform quick linear movement and slow linear movement along the axes A1 and A2 in opposite directions, so that the driven member 110 is largely driven beyond the strokes of the piezoelectric elements 123 and 124. Herein, quick linear movement means linear movement at a speed at which slip occurs between the driving portion 121 and the driven member 110, and slow linear movement means linear movement at a speed at which no slip occurs between the driving portion 121 and the driven member 110. Quick linear movement and slow linear movement in opposite directions will be referred to as quick-and-slow linear movement. In addition, the controller 140 actuates the piezoelectric elements 123 and 124 so as to cause the driving portions 121 to perform only slow linear movement, so that the driven member 110 is slightly driven within the strokes of the piezoelectric elements 123 and 124.

Figure 3:
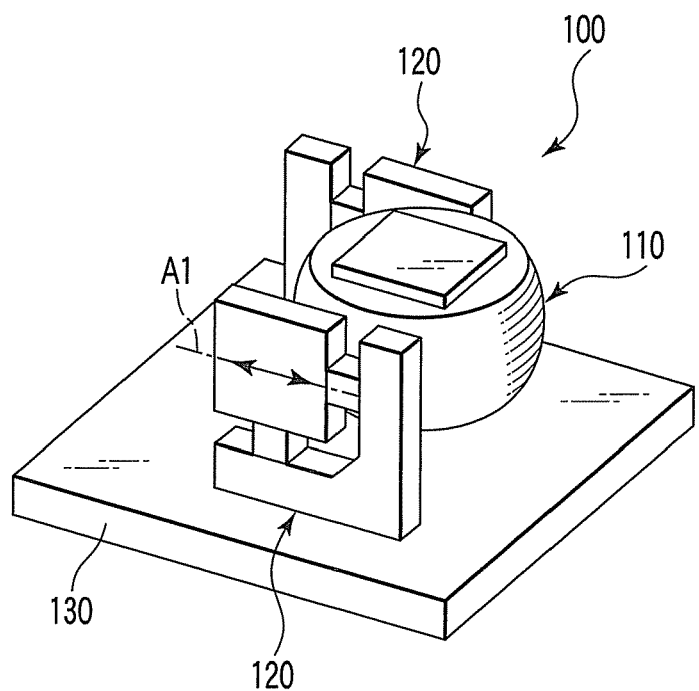
FIG. 3 is a perspective view showing a state wherein a driven member is linearly moved along the x-axis in the driving mechanism in FIG. 1.
Figure 3:
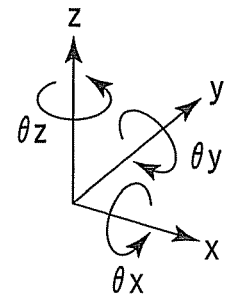
Figure 4:
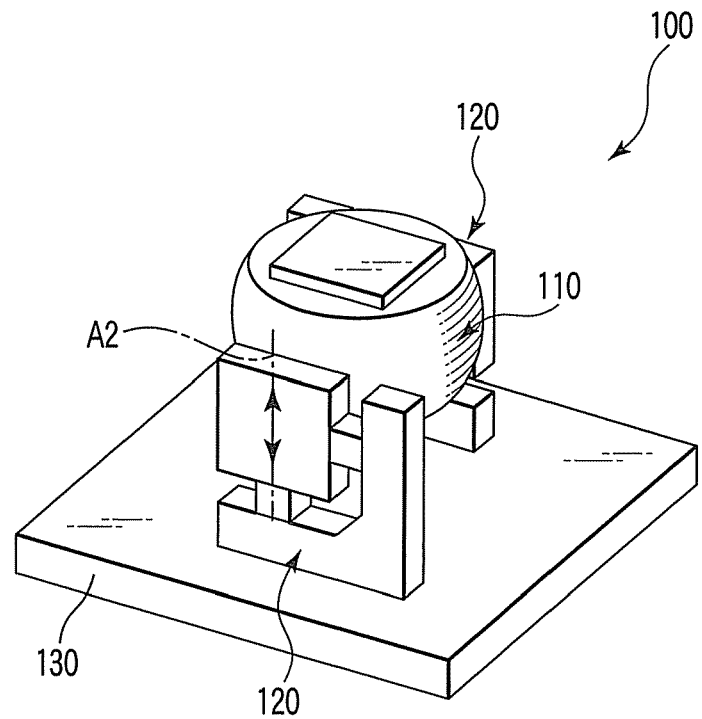
FIG. 4 is a perspective view showing a state wherein the driven member is linearly moved along the z-axis in the driving mechanism in FIG. 1.
Figure 4:
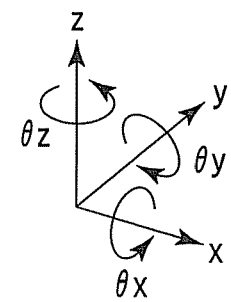

More specifically, actuating the piezoelectric elements 123 so as to cause the driving portions 121 to perform quick-and-slow linear movement in synchronism with each other along the axis A1, i.e., the x-axis, in the same direction will linearly move the driven member 110 along the x-axis beyond the stroke of the piezoelectric elements 123, as shown in FIG. 3. More specifically, performing quick linear movement in the −x direction and slow linear movement in the +x direction will linearly move the driven member 110 in the +x direction. Reversing the directions of quick linear movement and slow linear movement will linearly move the driven member 110 in the −x direction. There is no limitation on the order of execution of quick linear movement and slow linear movement. Since the two piezoelectric units 120 are arranged symmetrically around the z-axis, opposite-phase driving signals are supplied to the piezoelectric elements 123 for this linear movement. Repeating quick linear movement and slow linear movement described above will linearly move the driven member 110 along the x-axis within a range in which contact between the driven member 110 and the driving portions 121 is maintained. In addition, actuating the piezoelectric elements 123 so as to cause the driving portions 121 to perform slow linear movement along the x-axis in the same direction will linearly move the driven member 110 along the x-axis within the stroke of the piezoelectric elements 123.

In addition, actuating the piezoelectric elements 124 so as to cause the driving portions 121 to perform quick-and-slow linear movement in synchronism with each other along the axis A2, i.e., the z-axis, in the same direction will linearly move the driven member 110 along the axis A2, i.e., the z-axis, beyond the stroke of the piezoelectric elements 124. The detailed operation of this movement is the same as the linear movement along the x-axis. That is, performing quick linear movement in the −z direction and slow linear movement in the +z direction will linearly move the driven member 110 in the +z direction. Reversing the directions of quick linear movement and slow linear movement will linearly move the driven member 110 in the −z direction. There is no limitation on the order of execution of quick linear movement and slow linear movement. In-phase driving signals are supplied to the piezoelectric elements 124 for this linear movement. Repeating quick linear movement and slow linear movement described above will linearly move the driven member 110 along the z-axis within a range in which contact between the driven member 110 and the driving portions 121 is maintained. In addition, actuating the piezoelectric elements 124 so as to cause the driving portions 121 to perform slow linear movement along the axis A2, i.e., the z-axis, in the same direction will linearly move the driven member 110 along the z-axis within the stroke of the piezoelectric elements 124.

Figure 5:
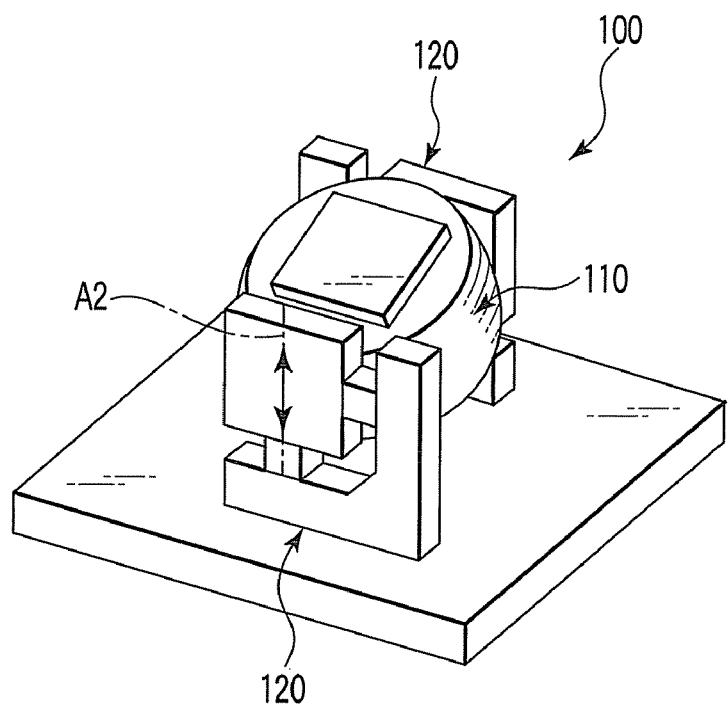
FIG. 5 is a perspective view showing a state wherein the driven member is rotationally moved about the x-axis in the driving mechanism in FIG. 1.
Figure 5:
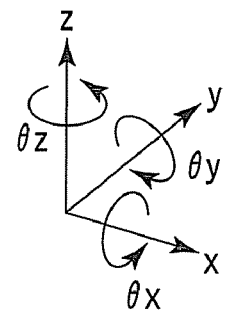

In addition, actuating the piezoelectric elements 124 so as to cause the driving portion 121 to perform quick-and-slow linear movement in synchronism with each other along the axis A2, i.e., the z-axis, in opposite directions will rotationally move the driven member 110 about an axis (i.e., the x-axis) that passes through the center of the spherical surface 111 of the driven member 110 and is parallel to the axis A1 beyond the stroke of the piezoelectric elements 124, as shown in FIG. 5. In other words, the driven member 110 is rotationally moved about the x-axis by actuating the piezoelectric elements 124 so as to cause the driving portions 121 to perform quick-and-slow linear movement in the same direction with respect to rotation about the x-axis (i.e., with respect to the direction of the θx-axis). More specifically, performing quick linear movement in the −θx direction and slow linear movement in the +θx direction will rotationally move the driven member 110 in the +θx direction. There is no limitation on the order of execution of quick linear movement and slow linear movement. Opposite-phase driving signals are supplied to the piezoelectric elements 124 for this rotational movement. Repeating quick linear movement and slow linear movement described above will rotationally move the driven member 110 about the x-axis without any limitation. In addition, actuating the piezoelectric elements 124 so as to cause the driving portions 121 to perform slow linear movement in the same direction with respect to the θx direction will rotationally move the driven member 110 about the x-axis within the stroke of the piezoelectric elements 124.

Figure 6:
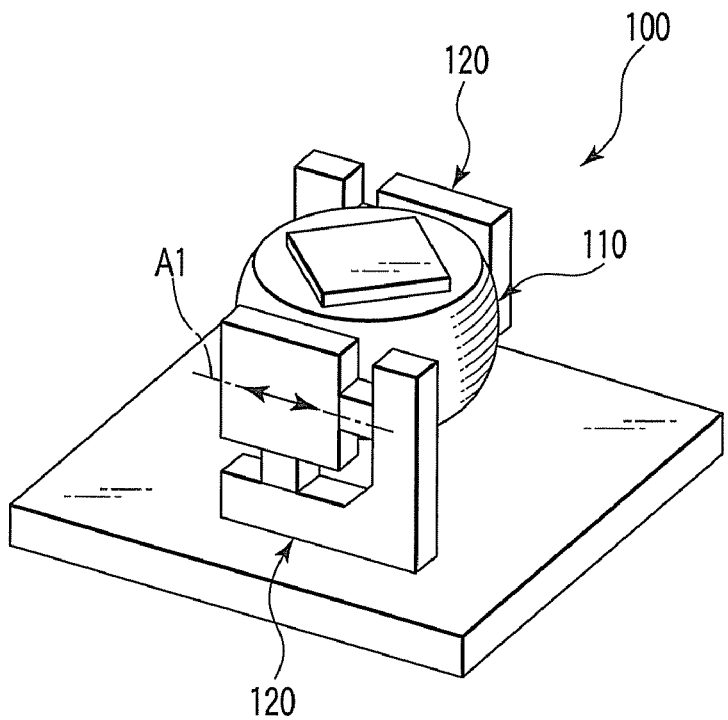
FIG. 6 is a perspective view showing a state wherein the driven member is rotationally moved about the z-axis in the driving mechanism in FIG. 1.
Figure 6:
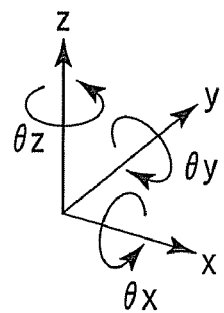
Figure 9:
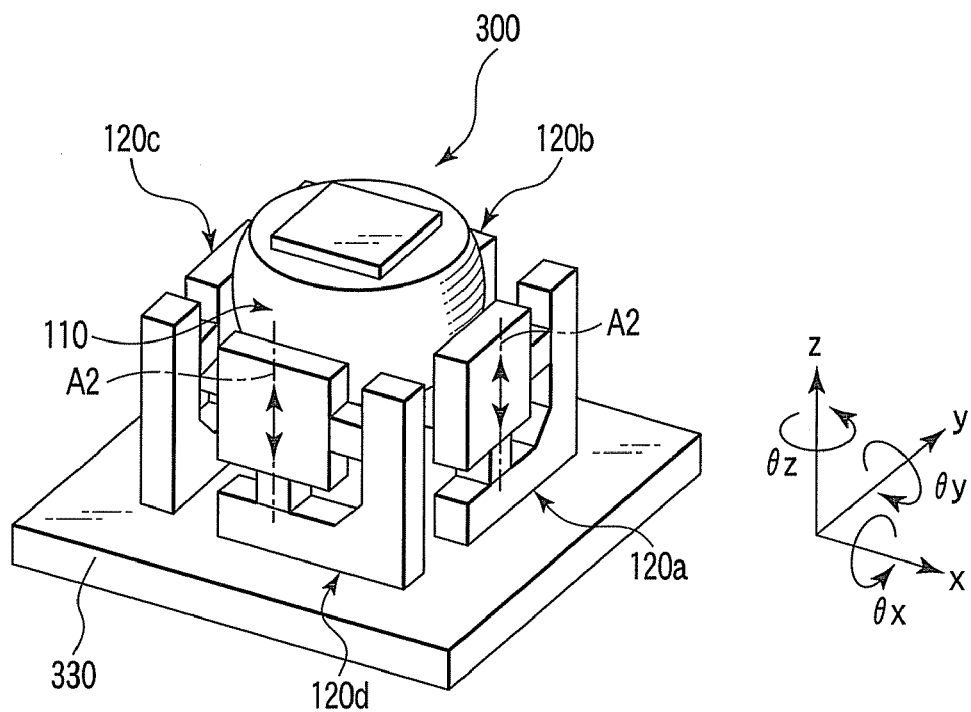
FIG. 9 is a perspective view showing a state wherein a driven member is linearly moved along the z-axis in the driving mechanism in FIG. 8.

In addition, actuating the piezoelectric elements 123 so as to cause the driving portion 121 to perform quick-and-slow linear movement in synchronism with each other along the axis A1, i.e., the x-axis, in opposite directions will rotationally move the driven member 110 about an axis (i.e., the z-axis) that passes through the center of the spherical surface 111 of the driven member 110 and is parallel to the axis A2 beyond the stroke of the piezoelectric elements 123, as shown in FIG. 6. In other words, the driven member 110 is rotationally moved about the z-axis beyond the stroke of the piezoelectric elements 123 by actuating the piezoelectric elements 123 so as to cause the driving portions 121 to perform quick-and-slow linear movement in the same direction with respect to rotation about the z-axis (i.e., with respect to the direction of the θz-axis). The detailed operation of this movement is the same as the rotational movement about the x-axis. That is, performing quick linear movement in the −θz direction and slow linear movement in the +θz direction will rotationally move the driven member 110 in the +θz direction. Reversing the directions of quick linear movement and slow linear movement will rotationally move the driven member 110 in the −θz direction. There is no limitation on the order of execution of quick linear movement and slow linear movement. In-phase driving signals are supplied to the piezoelectric elements 123 for this rotational movement. Repeating quick linear movement and slow linear movement described above will rotationally move the driven member 110 about the z-axis without any limitation. In addition, actuating the piezoelectric elements 123 so as to cause the driving portions 121 to perform slow linear movement in the same direction with respect to the θz direction will rotationally move the driven member 110 about the z-axis within the stroke of the piezoelectric elements 123.

As described above, the driving mechanism 100 of this embodiment can directly drive the driven member 110 with a total of four axes, i.e., the two translational x-and z-axes and the two rotational θx-and θz-axes, by properly and selectively actuating the piezoelectric elements 123 and 124 of the two piezoelectric units 120.

Second Embodiment

The second embodiment will be described with reference to FIG. 7. The same reference numerals as in FIG. 7 denote the same members in the first embodiment, and a detailed description thereof will be omitted.

As shown in FIG. 7, a driving mechanism 200 of this embodiment includes a driven member 110 partially having a spherical surface 111, three piezoelectric units 120 that support the driven member 110 between them and drive the driven member 110, a base 230 that holds the piezoelectric units 120, and a controller 240 that controls the piezoelectric units. The three piezoelectric units 120 are arranged so that driving portions 121 are arranged at equal intervals to surround the driven member 110. Support members 125 are fixed on the base 230 so that the driving portions 121 are located on a circumference slightly smaller than the great circle of the spherical surface of the driven member 110. The great circle is a circle on the cut surface obtained by cutting the spherical surface with a plane passing through its center. With this structure, the driven member 110 is supported by the elastic deformation of the three piezoelectric units 120.

In the following description, as in the first embodiment, an xyz orthogonal coordinate system is set so that the x-and y-axes are parallel to a flat surface 231 of the base 230, on which the piezoelectric units 120 are placed, and the z-axis is perpendicular to the flat surface 231. The θx-, θy-, and θz-axes are set around the x-, y-, and z-axes.

In the driving mechanism 200, as in the first embodiment, the controller 240 actuates piezoelectric elements 123 and 124 so as to cause the driving portions 121 to perform quick linear movement and slow linear movement along axes A1 and A2 in opposite directions, so that the driven member 110 is driven beyond the strokes of the piezoelectric elements 123 and 124. In addition, the controller 240 actuates the piezoelectric elements 123 and 124 so as to cause the driving portions 121 to perform only slow linear movement, so that the driven member 110 is slightly driven within the strokes of the piezoelectric elements 123 and 124.

More specifically, actuating the piezoelectric elements 124 to cause the driving portions 121 so as to perform slow linear movement in synchronism with each other along the axis A2, i.e., the z-axis, in the same direction will linearly move the driven member 110 along the z-axis beyond the stroke of the piezoelectric elements 124. The detailed operation of this movement is the same as that of the linear movement along the z-axis that has been described in the first embodiment, and a detailed description thereof will be omitted. In addition, actuating the piezoelectric elements 124 so as to cause the driving portions 121 to perform slow linear movement along the axis A2, i.e., the z-axis, in the same direction will linearly move the driven member 110 along the z-axis within the stroke of the piezoelectric elements 124.

The driven member 110 is rotationally moved about the z-axis beyond the stroke of the piezoelectric elements 123 by actuating the piezoelectric elements 123 so as to cause the driving portions 121 to perform quick-and-slow linear movement in synchronism with each other in the same direction with respect to rotation about an axis (i.e., the z-axis) that passes through the center of the spherical surface 111 of the driven member 110 and is parallel to the axis A2 (i.e., with respect to the direction of the θz-axis). The detailed operation of this movement is the same as the rotational movement about the z-axis described in the first embodiment, and a detailed description thereof will be omitted. In addition, actuating the piezoelectric elements 123 so as to cause the driving portions 121 to perform slow linear movement in the same direction with respect to the θz-axis will rotationally move the driven member 110 about the z-axis within the stroke of the piezoelectric element 123.

In addition, selectively actuating the piezoelectric elements 124 so as to cause the driving portions 121 to perform quick-and-slow linear movement along the axis A2, i.e., the z-axis, will rotationally move the driven member 110 about an axis (i.e., an axis located on the x-y plane) that passes through the center of the spherical surface 111 of the driven member 110 and is perpendicular to the axis A2 beyond the stroke of the piezoelectric elements 124. The selective driving operation of the piezoelectric elements 124 includes the following driving operation: driving the piezoelectric element 124 so as to cause one driving portion 121 to perform quick-and-slow linear movement along the axis A2, i.e., the z-axis; driving the piezoelectric elements 124 so as to cause two driving portions 121 to perform quick-and-slow linear movement along the axis A2, i.e., the z-axis in the same direction; driving the piezoelectric elements 124 so as to cause two driving portions 121 to perform quick-and-slow linear movement in opposite directions along the axis A2, i.e., the z-axis; driving the piezoelectric elements 124 so as to cause the three driving portion 121 to perform quick-and-slow linear movement along the axis A2, i.e., the z-axis, in which one driving portion 121 is opposite in moving direction to the other two driving portions 121. In addition, selectively actuating the piezoelectric elements 124 so as to cause the driving portions 121 to perform slow linear movement along the axis A2, i.e., the z-axis, will rotationally move the driven member 110 about an axis (i.e., the z-axis) that passes through the center of the spherical surface 111 of the driven member 110 and is perpendicular to the axis A2 within the stroke of the piezoelectric elements 124.

As described above, according to the driving mechanism 200 of this embodiment can directly drive the driven member 110 with a total of four axes, i.e., one translational z-axis and three rotational θx-, θy-, and θz-axes, by properly and selectively actuating the piezoelectric elements 123 and 124 of the three piezoelectric units 120.

Third Embodiment

The arrangement of a driving mechanism according to the third embodiment will be described with reference to FIG. 8. The same reference numerals as in FIG. 8 denote the same members in the first embodiment, and a detailed description thereof will be omitted.

As shown in FIG. 8, a driving mechanism 300 according to this embodiment includes a driven member 110 partially having a spherical surface 111, four piezoelectric units 120 that support the driven member 110 between them and drive the driven member 110, a base 330 that holds the four piezoelectric units 120, and a controller 340 that controls the piezoelectric units.

In the following description, the four piezoelectric units are discriminated by assigning them with reference numerals 120a, 120b, 120c, and 120d. In addition, an xyz orthogonal coordinate system and the θx-, θy-, and θz-axes are set in the same manner as in the first embodiment. That is, the xyz orthogonal coordinate system is set so that the x-and y-axes are parallel to a flat surface 331 of the base 330, on which the piezoelectric units 120a, 120b, 120c, and 120d are placed, and the z-axis is perpendicular to the flat surface 331. In addition, the θx-, θy-, and θz-axes are set around the x-, y-, and z-axes, respectively. Assume that the positive direction of the θx-axis is the clockwise direction in the +x direction. This also applies to the θy-and θz-axes.

The four piezoelectric units constitute a first unit group including the two piezoelectric units 120a and 120c and a second unit group including the two piezoelectric units 120b and 120d.

The piezoelectric units 120a and 120c of the first unit group are arranged so that driving portions 121 face each other through the driven member 110, and flat surfaces 122 of the driving portions 121 are parallel to each other. The piezoelectric units 120a and 120c are placed on the base 330 so that an axis A1 is parallel to the y-axis, and an axis A2 is parallel to the z-axis. The piezoelectric units 120a and 120c are arranged symmetrically around the z-axis. The piezoelectric unit 120c is placed in a direction rotated about the axis A2 by 180° with respect to the piezoelectric unit 120a.

The piezoelectric units 120b and 120d of the second unit group are arranged so that driving portions 121 face each other through the driven member 110, and flat surfaces 122 of the driving portions 121 are parallel to each other. The piezoelectric units 120b and 120d are placed on the base 330 so that an axis A1 is parallel to the x-axis, and an axis A2 is parallel to the z-axis. The piezoelectric units 120b and 120d are arranged symmetrically around the z-axis. The piezoelectric unit 120d is placed in a direction rotated about the axis A2 by 180° with respect to the piezoelectric unit 120b.

The flat surfaces 122 of the driving portions 121 of the piezoelectric units 120a and 120c of the first unit group are perpendicular to the flat surfaces 122 of the driving portions 121 of the piezoelectric units 120b and 120d of the second unit group.

Support members 125 of the piezoelectric units 120a and 120c of the first unit group are fixed on the base 330 so that the distance between the driving portions 121 is slightly smaller than the diameter of the spherical surface of the driven member 110. Likewise, support members 125 of the piezoelectric units 120b and 120d of the second unit group are fixed on the base 330 so that the distance between the driving portions 121 is slightly smaller than the diameter of the spherical surface of the driven member 110. With this structure, the driven member 110 is supported by the elastic deformation of the four piezoelectric units 120a, 120b, 120c, and 120d.

The operation of the driving mechanism 300 will be described with reference to FIGS. 8 to 12.

As in the first embodiment, in the driving mechanism 300, the controller 340 actuates piezoelectric elements 123 and 124 so as to cause the driving portions 121 to perform quick liner movement and slow linear movement along the axes A1 and A2 in opposite directions, so that the driven member 110 is largely driven beyond the strokes of the piezoelectric elements 123 and 124. In addition, the controller 340 actuates the piezoelectric elements 123 and 124 so as to cause the driving portions 121 to perform only slow linear movement, so that the driven member 110 is slightly driven within the strokes of the piezoelectric elements 123 and 124.

More specifically, actuating the piezoelectric elements 124 so as to cause the driving portions 121 of the piezoelectric units 120a, 120b, 102c, and 120d to perform quick-and-slow linear movement in synchronism with each other along the axis A2, i.e., the z-axis, will linearly move the driven member 110 along the z-axis beyond the stroke of the piezoelectric elements 124. The detailed operation of this movement is the same as that of the linear movement along the z-axis described in the first embodiment, and a detailed description thereof will be omitted. In addition, actuating the piezoelectric elements 124 so as to cause the driving portions 121 to perform slow linear movement along the axis A2, i.e., the z-axis, in the same direction will linearly move the driven member 110 along the z-axis within the stroke of the piezoelectric elements 124.

Figure 10:
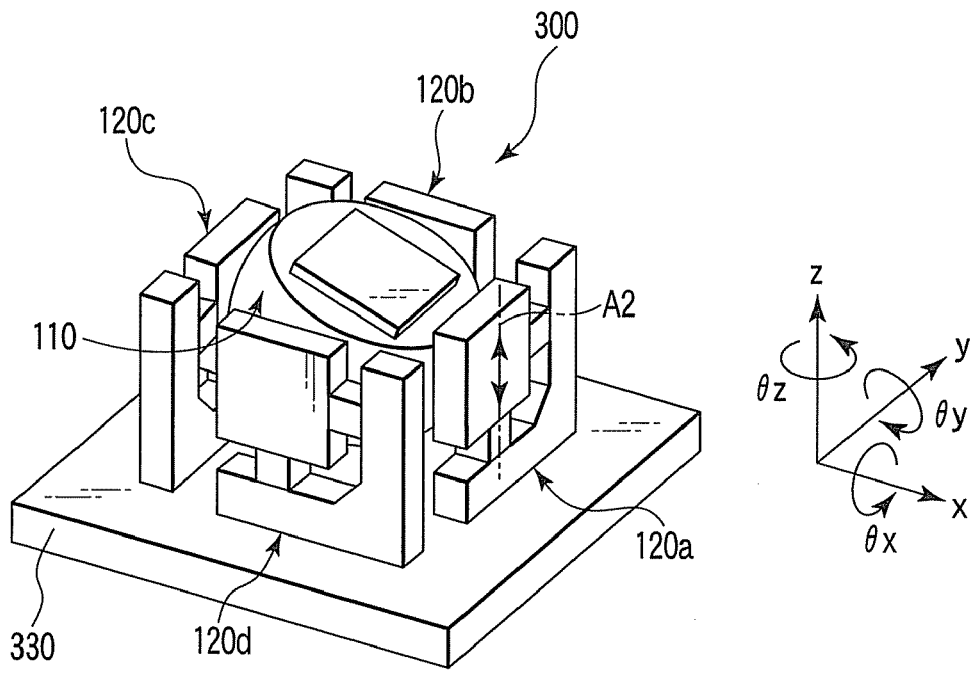
FIG. 10 is a perspective view showing a state wherein the driven member is rotationally moved about the y-axis in the driving mechanism in FIG. 8.

Actuating the piezoelectric elements 124 so as to cause the driving portions 121 of the piezoelectric elements 120a and 120c of the first unit group to perform quick-and-slow linear movement in synchronism with each other along the axis A2 in opposite directions, in other words, actuating the piezoelectric elements 124 so as to cause the driving portions 121 to perform quick-and-slow linear movement in synchronism with each other in the same direction with respect to rotation about an axis (i.e., the y-axis) that passes through the center of the spherical surface 111 of the driven member 110 and is parallel to the axis A1 (i.e., with respect to the direction of the θy-axis), will rotationally move the driven member 110 about the y-axis beyond the stroke of the piezoelectric elements 124, as shown in FIG. 10. The detailed operation of this movement is the same as that of the rotational movement about the y-axis described in the first embodiment, and a detailed description thereof will be omitted. In addition, actuating the piezoelectric elements 124 so as to cause the driving portions 121 to perform slow linear movement in the same direction with respect to the θy direction will rotationally move the driven member 110 about the y-axis within the stroke of the piezoelectric elements 124.

Actuating the piezoelectric elements 124 so as to cause the driving portions 121 of the piezoelectric elements 120b and 120d of the second unit group to perform quick-and-slow linear movement in synchronism with each other along the axis A2 in opposite directions, in other words, actuating the piezoelectric elements 124 so as to cause the driving portions 121 to perform quick-and-slow linear movement in synchronism with each other in the same direction with respect to rotation about an axis (i.e., the x-axis) that passes through the center of the spherical surface 111 of the driven member 110 and is parallel to the axis A1 (i.e., with respect to the direction of the θx-axis), will rotationally move the driven member 110 about the x-axis beyond the stroke of the piezoelectric elements 124, as shown in FIG. 11. The detailed operation of this movement is the same as that of the rotational movement about the y-axis described in the first embodiment, and a detailed description thereof will be omitted. In addition, actuating the piezoelectric elements 124 so as to cause the driving portions 121 to perform slow linear movement in the same direction with respect to the θx direction will rotationally move the driven member 110 about the x-axis within the stroke of the piezoelectric elements 124.

Actuating the piezoelectric elements 123 so as to cause the driving portions 121 of all the piezoelectric units 120a, 120b, 120c, and 120d to perform quick-and-slow linear movement in synchronism with each other in the same direction with respect to an axis (i.e., the z-axis) that passes through the center of the spherical surface 111 of the driven member 110 and is parallel to the axis A2 (i.e., with respect to the direction of the θz-axis) will rotationally move the driven member 110 about the z-axis beyond the stroke of the piezoelectric elements 123, as shown in FIG. 12. The detailed operation of this movement is the same as that of the rotational movement about the z-axis described in the first embodiment, and a detailed description thereof will be omitted. In addition, actuating the piezoelectric elements 123 so as to cause the driving portions 121 to perform slow linear movement in the same direction with respect to the θz direction will rotationally move the driven member 110 about the z-axis within the stroke of the piezoelectric elements 123.

As described above, according to the driving mechanism 300 of this embodiment can directly drive the driven member 110 with a total of four axes, i.e., one translational z-axis and three rotational θx-, θy-, and θz-axes, by properly and selectively actuating the piezoelectric elements 123 and 124 of the four piezoelectric units 120a, 120b, 120c, and 120d.

Fourth Embodiment

The arrangement of a driving mechanism according to this embodiment will be described with reference to FIGS. 13 and 14.

Figure 13:
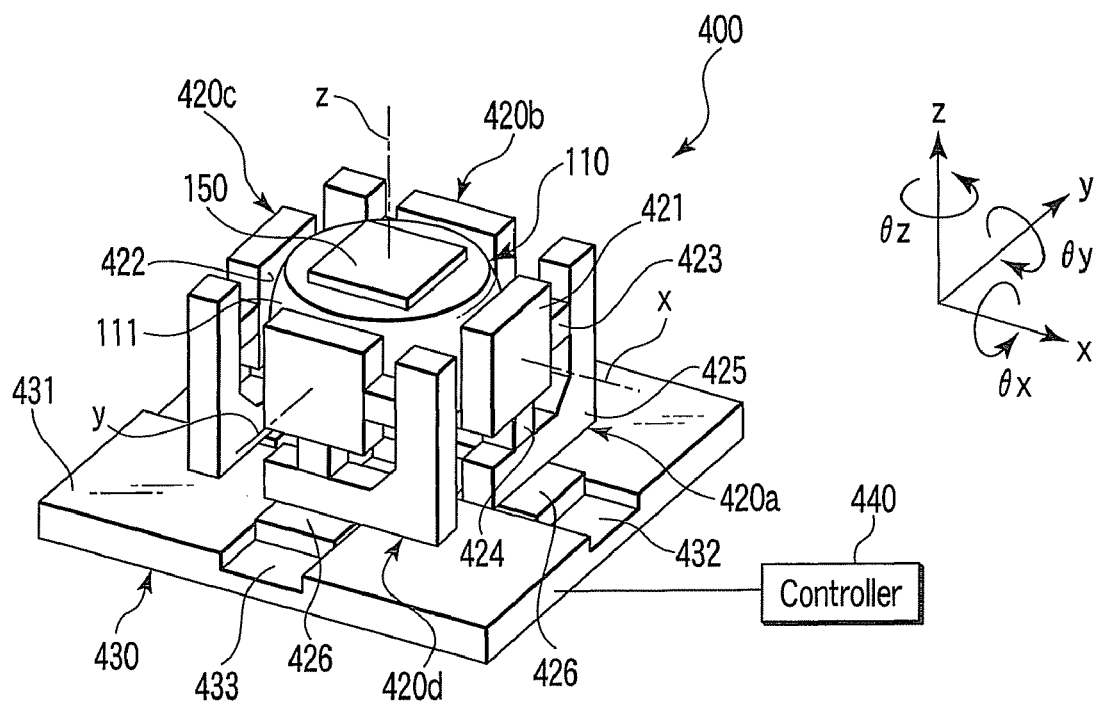
FIG. 13 is a perspective view of a driving mechanism according to the fourth embodiment.

As shown in FIG. 13, a driving mechanism 400 of this embodiment includes a driven member 110 partially having a spherical surface 111, four piezoelectric units 420 that support the driven member 110 between them and drive the driven member 110, a base 430 that holds the piezoelectric units 420, and a controller 440 that controls the piezoelectric units.

Figure 14:
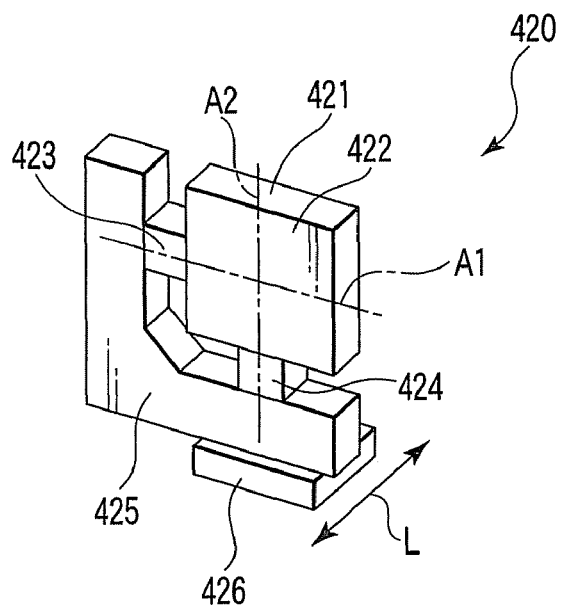
FIG. 14 is an enlarged perspective view of a piezoelectric unit in FIG. 13.

As shown in FIG. 14, each of the piezoelectric units 420 includes a driving portion 421 having a flat surface 422 in contact with the spherical surface of the driven member 110, a first piezoelectric element 423 that linearly moves the driving portion 421 along a first axis A1 parallel to the flat surface 422, a second piezoelectric element 424 that linearly moves the driving portion 421 along a second axis A2 that is parallel to the flat surface 422 and perpendicular to the axis A1, a support member 425 that supports the driving portion 421 through the piezoelectric elements 423 and 424, and linear guide portions 426 that directly drivably support the piezoelectric units with respect to the base 430. The piezoelectric element 423 extends along the axis A1 and has an end coupled to the driving portion 421 and the other end coupled to the support member 425. The piezoelectric element 424 extends along the axis A2 and has an end coupled to the driving portion 421 and the other end coupled to the support member 425. The linear guide portions 426 are fixed on the support members 425 so that a direct driving direction L of the linear guide portion is perpendicular to the flat surface 422 of the driving portion 421.

In the following description, the four piezoelectric units are discriminated by assigning them with reference numerals 420a, 420b, 420c, and 420d. In addition, an xyz orthogonal coordinate system and the θx-, θy-, and θz-axes are set in the same manner as in the first embodiment. That is, the xyz orthogonal coordinate system is set so that the x-and y-axes are parallel to a flat surface 431 of the base 430, on which the piezoelectric units 420a, 420b, 420c, and 420d are placed, and the z-axis is perpendicular to the flat surface 431. In addition, the θx-, θy-, and θz-axes are set around the x-, y-, and z-axes, respectively. Assume that the positive direction of the θx-axis is the clockwise direction in the +x direction. This also applies to the θy-and θz-axes.

The four piezoelectric units constitute a first unit group including the two piezoelectric units 420a and 420c and a second unit group including the two piezoelectric units 420b and 420d.

The base 430 includes a guide bearing portion 432 that accommodates the linear guide portions 426 of the piezoelectric units 420a and 420c of the first unit group and allows the linear guide portions 426 to linearly move and a guide bearing portion 433 that accommodates linear guide portions 426 of the piezoelectric units 420b and 420d of the second unit group and allows the linear guide portions 426 to linearly move. The guide bearing portion 432 extends along the x-axis. The guide bearing portion 433 extends along the y-axis.

The linear guide portions 426 and the guide bearing portion 432 allow the piezoelectric units 420a and 420c of the first unit group to linearly move along the x-axis. The linear guide portions 426 and the guide bearing portion 433 allow the piezoelectric units 420b and 402d of the second unit group to linearly move along the y-axis.

The guide bearing portion 432 may be divided into portions to be exclusively used for the linear guide portions 426 of the piezoelectric units 420a and 420c. Likewise, the guide bearing portion 433 may be divided into portions to be exclusively used for the linear guide portions 426 of the piezoelectric units 420b and 420d. Such division of the guide bearing portions 432 and 433 is effective when, for example, a through hole is vertically formed in the central portion of the base 430.

The piezoelectric units 420a and 420c of the first unit group are arranged so that the driving portions 421 face each other through the driven member 110, and the flat surfaces 422 of the driving portions 421 are parallel to each other. The piezoelectric units 420a and 420c are placed on the base 430 so that the axis A1 is parallel to the y-axis, and the axis A2 is parallel to the z-axis. The piezoelectric units 420a and 420c are arranged symmetrically around the z-axis. The piezoelectric unit 402c is placed in a direction rotated about the axis A2 by 180° with respect to the piezoelectric unit 420a.

The piezoelectric units 420b and 420d of the second unit group are arranged so that the driving portions 421 face each other through the driven member 110, and flat surfaces 422 of the driving portions 421 are parallel to each other. The piezoelectric units 420b and 420d are placed on the base 430 so that the axis A1 is parallel to the x-axis, and the axis A2 is parallel to the z-axis. The piezoelectric units 420b and 420d are arranged symmetrically around the z-axis. The piezoelectric unit 420d is placed in a direction rotated about the axis A2 by 180° with respect to the piezoelectric unit 420b.

The flat surfaces 422 of the driving portions 421 of the piezoelectric units 420a and 420c of the first unit group are perpendicular to the flat surfaces 422 of the driving portions 421 of the piezoelectric units 420b and 420d of the second unit group.

The support members 425 of the piezoelectric units 420a and 420c of the first unit group are coupled to each other. Likewise, the support members 425 of the piezoelectric units 420b and 420d of the second unit group are coupled to each other.

For example, the support members 425 of the piezoelectric units 420a and 420c of the first unit group are coupled to each other through a coupling portion 427a so that the distance between the driving portions 421 is slightly smaller than the diameter of the spherical surface of the driven member 110, as shown in FIG. 15. Likewise, the support members 425 of the piezoelectric units 420b and 420d of the second unit group are coupled to each other through a coupling portion 427b so that the distance between the driving portions 421 is slightly smaller than the diameter of the spherical surface of the driven member 110, as shown in FIG. 16.

The piezoelectric units 420a and 420c of the first unit group and the piezoelectric units 420b and 420d of the second unit group are placed on the base 430 so that the coupling portions 427a and 427b are stacked on each other, the linear guide portions 426 of the piezoelectric units 420a and 420c are accommodated in the guide bearing portion 432, and the linear guide portions 426 of the piezoelectric units 420b and 420d are accommodated in the guide bearing portion 433. The coupling portions 427a and 427b are partially notched so as not to interfere with each other.

Figure 19:
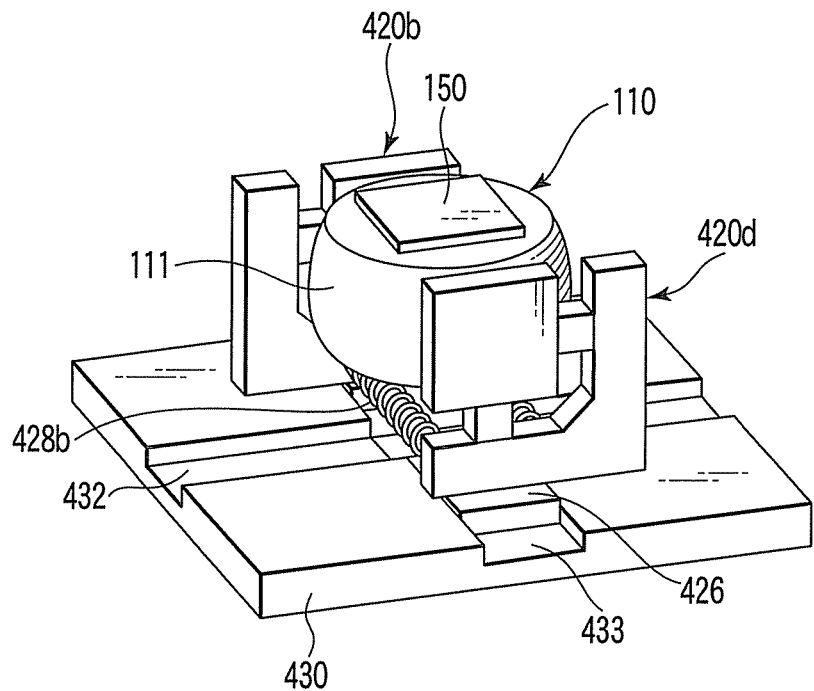
FIG. 19 is a perspective view showing another second unit group used in the driving mechanism in FIG. 13.

According to another example, the support members 425 of the piezoelectric units 420a and 420c of the first unit group are coupled to each other through biasing members 428a such as coil springs, and are biased to bring the driving portions 421, which face each other through the driven member 110, close to each other, as shown in FIG. 18. FIG. 18 does not illustrate the second unit group to show the structure of the first unit group. Likewise, as shown in FIG. 19, the support members 425 of the piezoelectric units 420b and 420d of the second unit group are coupled to each other through biasing members 428b such as coil springs, and are biased to bring the driving portions 421, which face each other through the driven member 110, close to each other. FIG. 19 does not illustrate the first unit group to show the structure of the second unit group.

Figure 20:
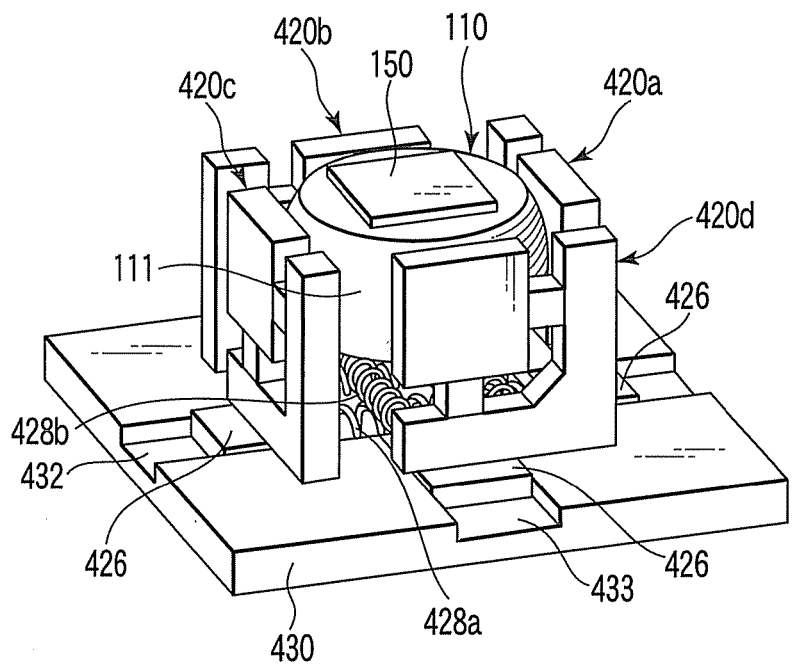
FIG. 20 is a perspective view of a driving mechanism assembled by using the unit groups in FIGS. 18 and 19.

As shown in FIG. 20, the piezoelectric units 420a and 420c of the first unit group and the piezoelectric units 420b and 420d of the second unit group are placed on the base 430 so that the biasing members 428a and 428b are stacked on each other, the linear guide portions 426 of the piezoelectric units 420a and 420c are accommodated in the guide bearing portion 432, and the linear guide portions 426 of the piezoelectric units 420b and 420c are accommodated in the guide bearing portion 433. The biasing members 428a and 428b are placed at different levels so as not to interfere with each other.

The operation of the driving mechanism 400 will be described with reference to FIGS. 21 to 26.

In the driving mechanism 400, as in the first embodiment, the controller 440 actuates the piezoelectric elements 423 and 424 so as to cause the driving portions 421 to perform quick linear movement and slow linear movement along the axes A1 and A2 in opposite directions, thereby largely driving the driven member 110 beyond the strokes of the piezoelectric elements 423 and 424. In addition, the controller 440 actuates the piezoelectric elements 423 and 424 so as to cause the driving portions 421 to perform only slow linear movement, so that the driven member 110 is driven within the strokes of the piezoelectric elements 423 and 424.

More specifically, actuating the piezoelectric elements 423 so as to cause the driving portions 421 of the piezoelectric units 420b and 420d of the second unit group to perform quick-and-slow linear movement in synchronism with each other along the axis A1, i.e., the x-axis, in the same direction will linearly move the driven member 110 along the x-axis beyond the stroke of the piezoelectric elements 423, as shown in FIG. 21. Since the piezoelectric units 420a and 420c of the first unit group can move along the x-axis, they are moved along the x-axis together with the driven member 110 without interfering with linear movement of the driven member 110 along the x-axis. The detailed operation of this movement is the same as the rotational movement along the x-axis described in the first embodiment, and a detailed description thereof will be omitted. In addition, actuating the piezoelectric elements 423 so as to cause the driving portions 421 to perform slow linear movement along the axis A1, i.e., the x-axis, in the same direction will linearly move the driven member 110 along the x-axis within the stroke of the piezoelectric elements 423.

In addition, actuating the piezoelectric elements 423 so as to cause the driving portions 421 of the piezoelectric units 420a and 420c of the first unit group to perform quick-and-slow linear movement in synchronism with each other along the axis A1, i.e., the y-axis, in the same direction will linearly move the driven member 110 along the y-axis beyond the stroke of the piezoelectric elements 423, as shown in FIG. 22. Since the piezoelectric units 420b and 420d of the second unit group can move along the y-axis, they are moved along the y-axis together with the driven member 110 without interfering with linear movement of the driven member 110 along the y-axis. FIG. 22 shows a state wherein the driven member 110 in the state in FIG. 21 is linearly moved in the +y direction. The detailed operation of this movement is the same as the linear movement along the x-axis described in the first embodiment, and a detailed description thereof will be omitted. In addition, actuating the piezoelectric elements 423 so as to cause the driving portions 421 to perform slow linear movement along the axis A1, i.e., the y-axis, in the same direction will linearly move the driven member 110 along the y-axis within the stroke of the piezoelectric elements 423.

Figure 23:
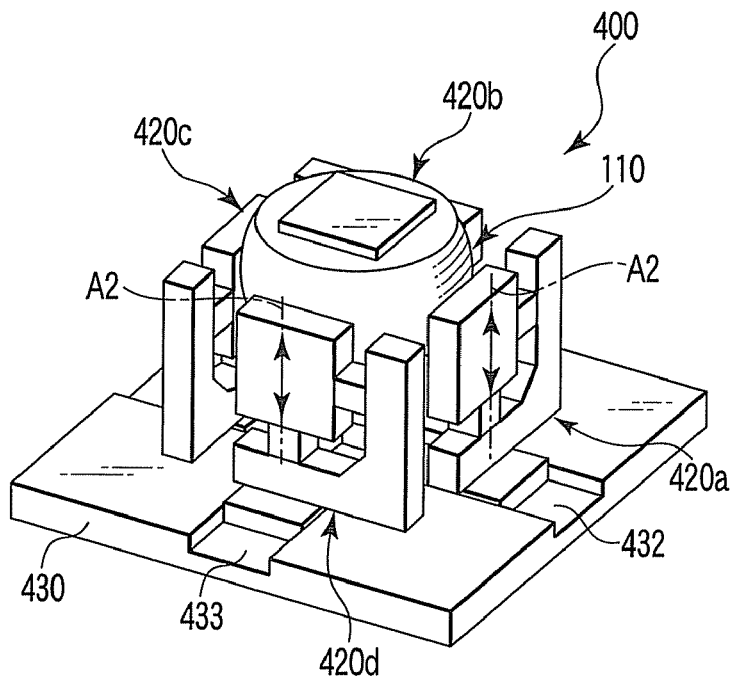
FIG. 23 is a perspective view showing a state wherein the driven member is linearly moved along the z-axis in the driving mechanism in FIG. 13.

In addition, actuating the piezoelectric elements 424 so as to cause the driving portions 421 of all the piezoelectric units 420a, 420b, 420c, and 420d to perform quick-and-slow linear movement in synchronism with each other along the axis A2, i.e., the z-axis, in the same direction will linearly move the driven member 110 along the z-axis beyond the stroke of the piezoelectric elements 424, as shown in FIG. 23. The detailed operation of this movement is the same as the linear movement along the z-axis described in the first embodiment, and a detailed description thereof will be omitted. In addition, actuating the piezoelectric elements 424 so as to cause the driving portions 421 to perform slow linear movement along the axis A2, i.e., the z-axis, in the same direction will linearly move the driven member 110 along the z-axis within the stroke of the piezoelectric elements 424.

Figure 24:
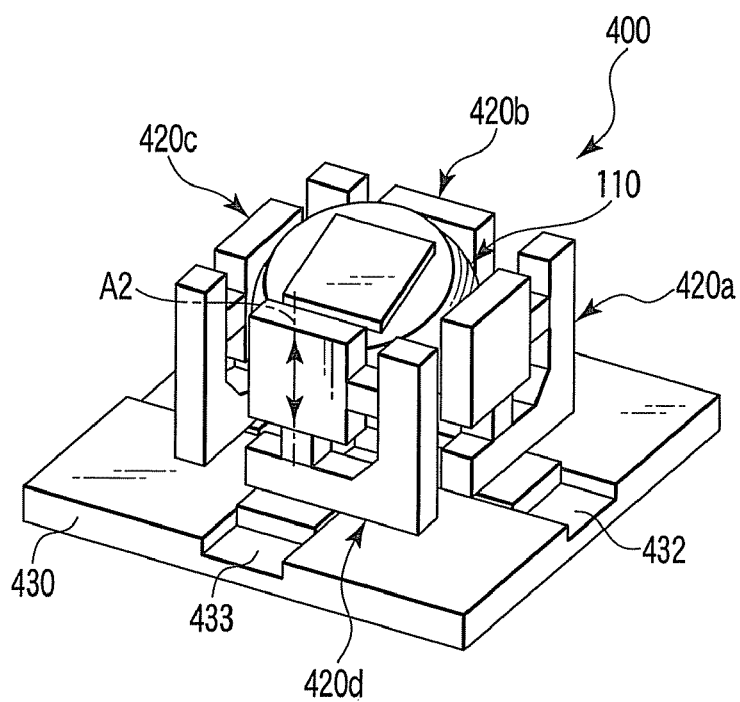
FIG. 24 is a perspective view showing a state wherein the driven member is rotationally moved about the x-axis in the driving mechanism in FIG. 13.

In addition, actuating the piezoelectric elements 424 so as to cause the driving portions 421 of the piezoelectric units 420b and 420d of the second unit group to perform quick-and-slow linear movement in synchronism with each other along the axis A2 in opposite directions, in other words, actuating the piezoelectric elements 424 so as to cause the driving portions 421 to perform quick-and-slow linear movement in synchronism with each other in the same direction with respect to rotation about an axis (i.e., the x-axis) that passes through the center of the spherical surface 111 of the driven member 110 and is parallel to the axis A1 (i.e., with respect to the direction of the θx-axis), will rotationally move the driven member 110 about the x-axis beyond the stroke of the piezoelectric elements 424, as shown in FIG. 24. The detailed operation of this movement is the same as the rotational movement about the y-axis described in the first embodiment, and a detailed description thereof will be omitted. In addition, actuating the piezoelectric elements 424 so as to cause the driving portions 421 to perform slow linear movement in the same direction with respect to the θx direction will rotationally move the driven member 110 about the x-axis within the stroke of the piezoelectric elements 424.

Figure 25:
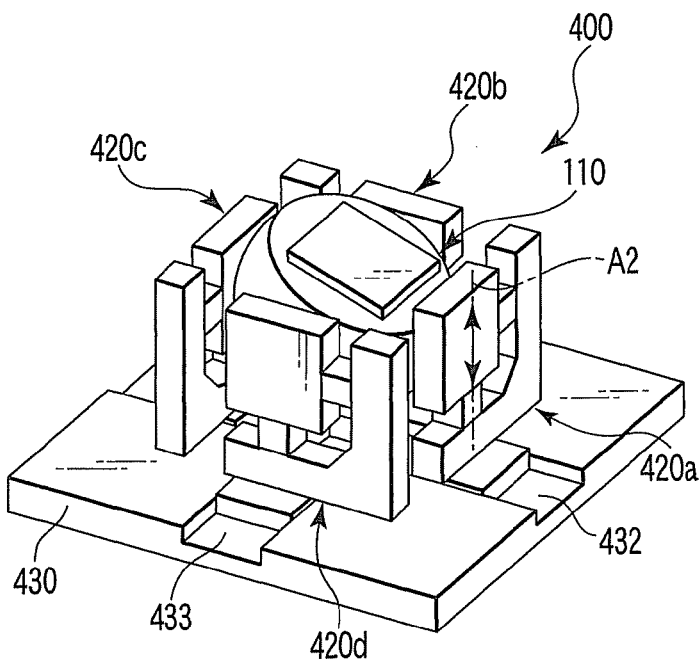
FIG. 25 is a perspective view showing a state wherein the driven member is rotationally moved about the y-axis in the driving mechanism in FIG. 13.
Figure 25:
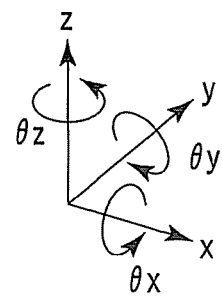

In addition, actuating the piezoelectric elements 424 so as to cause the driving portions 421 of the piezoelectric units 420a and 420c of the first unit group to perform quick-and-slow linear movement in synchronism with each other along the axis A2 in opposite directions, in other words, actuating the piezoelectric elements 424 so as to cause the driving portions 421 to perform quick-and-slow linear movement in synchronism with each other in the same direction with respect to rotation about an axis (i.e., the y-axis) that passes through the center of the spherical surface 111 of the driven member 110 and is parallel to the axis A1 (i.e., with respect to the direction of the θy-axis), will rotationally move the driven member 110 about the y-axis beyond the stroke of the piezoelectric elements 424, as shown in FIG. 25. The detailed operation of this movement is the same as the rotational movement about the y-axis described in the first embodiment, and a detailed description thereof will be omitted. In addition, actuating the piezoelectric elements 424 so as to cause the driving portions 421 to perform slow linear movement in the same direction with respect to the θy direction will rotationally move the driven member 110 about the y-axis within the stroke of the piezoelectric elements 424.

Figure 26:
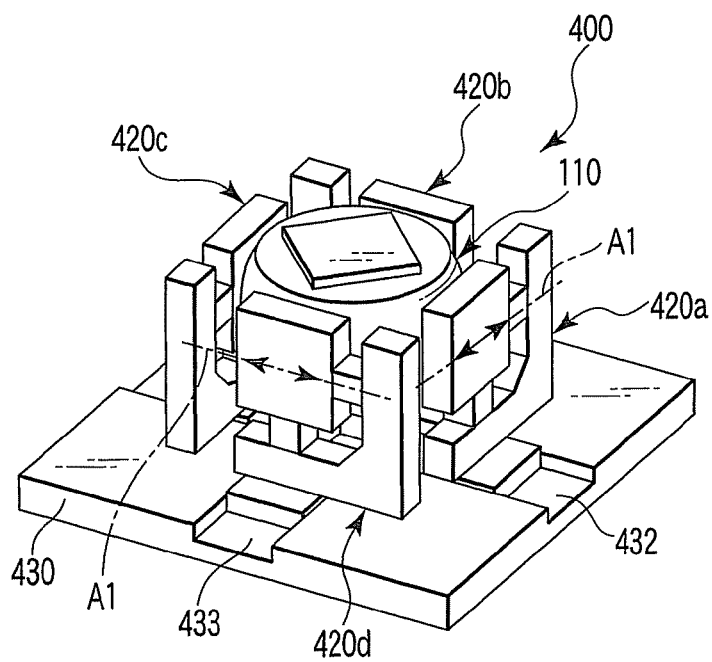
FIG. 26 is a perspective view showing a state wherein the driven member is rotationally moved about the z-axis in the driving mechanism in FIG. 13.
Figure 26:
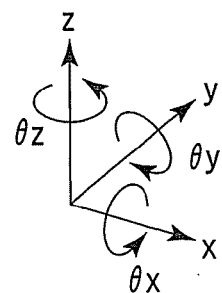

Actuating the piezoelectric elements 423 so as to cause the driving portions 421 of all the piezoelectric units 420a, 420b, 420c, and 420d to perform quick-and-slow linear movement in synchronism with each other in the same direction with respect to rotation about an axis (i.e., the z-axis) that passes through the center of the spherical surface 111 of the driven member 110 and is parallel to the axis A2 (i.e., with respect to the direction of the θz-axis) will rotationally move the driven member 110 about the z-axis beyond the stroke of the piezoelectric elements 423, as shown in FIG. 26. The detailed operation of this movement is the same as that of the rotational movement about the z-axis described in the first embodiment, and a detailed description thereof will be omitted. In addition, actuating the piezoelectric elements 423 so as to cause the driving portions 421 to perform slow linear movement in the same direction with respect to the θz direction will rotationally move the driven member 110 along the z-axis within the stroke of the piezoelectric elements 423.

As described above, according to the driving mechanism 400 of this embodiment can directly drive the driven member 110 with a total of six axes, i.e., three translational x-, y-, and z-axes and three rotational θx-, θy-, and θz-axes, by properly and selectively actuating the piezoelectric elements 423 and 424 of the four piezoelectric units 420a, 420b, 420c, and 420d. This can achieve speed-up by multi-degree-of-freedom direct driving and implement the simplification of a controller by using a structure that is robust against axis interference, in particular. In addition, it can be expected to reduce the size of the overall apparatus while achieving a wide movable range (three rotational axes principally allow an infinite range, in particular).

Fifth Embodiment

This embodiment is a camera apparatus using the driving mechanism 400 of the fourth embodiment. The arrangement of this camera apparatus will be described with reference to FIG. 27.

Figure 27:
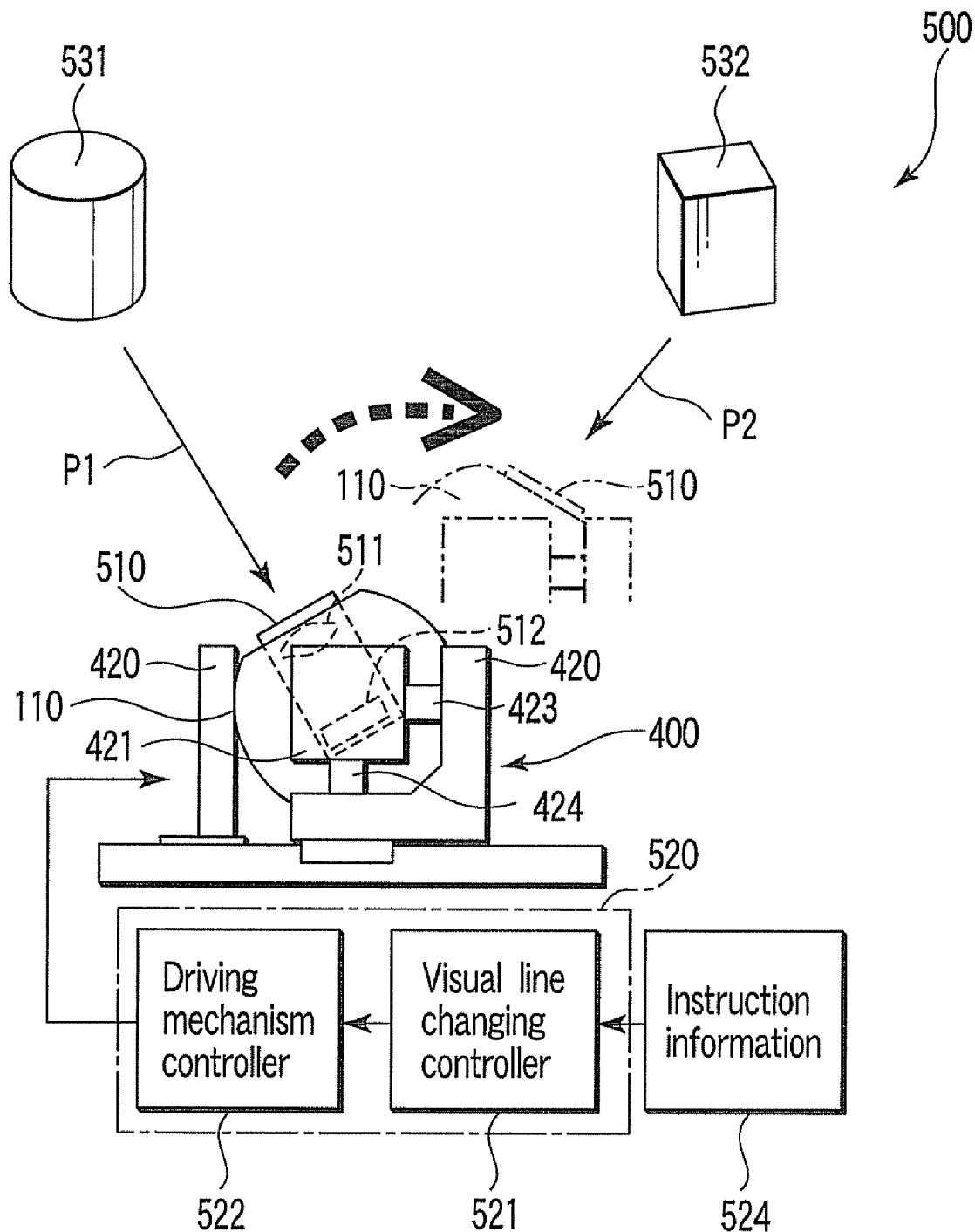
FIG. 27 is a view conceptually showing a camera apparatus according to the fifth embodiment.

As shown in FIG. 27, a camera apparatus 500 of this embodiment includes a driving mechanism 400, a camera module 510 that takes images of objects 531 and 532, and a controller 520 that controls piezoelectric units 420 of the driving mechanism 400. The camera module 510 is mounted on a driven member 110 of the driving mechanism 400. The camera module 510 includes a lens 511 that forms object light beams from the objects 531 and 532 into images and an image sensor 512 that acquires the formed optical images. The driving mechanism 400 can drive the driven member 110 with three rotational axes, and hence can freely change the visual line direction of the camera module 510. The controller 520 includes a visual line changing controller 521 for changing the visual line direction of the camera module 510 on the basis of instruction information 524 and a driving mechanism controller 522 that controls the driving mechanism 400 on the basis of an operation signal generated by the visual line changing controller 521. The controller 520 changes the visual line direction of the camera module 510 by rotating/moving the driven member 110 on the basis of instruction information 524, thereby adjusting the elevation angle direction, azimuth angle direction, and rotational angle direction about the vial axis of the camera module 510.

The camera module 510 takes an image of the object 531. An object light beam P1 from the object 531 is guided to the camera module 510 and formed into an image on the image sensor 512 by the lens 511. The visual line direction of the camera module 510 is switched from the object 531 to the object 532 in the following procedure. The operator gives the instruction information concerning the object 532. In this case, the instruction information 524 is information concerning the elevation angle direction, azimuth angle direction, and rotational angle direction about the vial axis of the camera module 510. The visual line changing controller 521 generates actuation signals for actuating piezoelectric elements 423 and 424 of the four piezoelectric units 420 of the driving mechanism 400 to change the visual line direction of the camera module 510 on the basis of the instruction information 524, and outputs the signals to the driving mechanism controller 522. The driving mechanism controller 522 drives the driven member 110 by actuating the piezoelectric elements 423 and 424 of the piezoelectric units 420 on the basis of the input actuation signals. As a result, the visual line direction of the camera module 510 is switched to the object 532, and the camera module 510 takes an image of the object 532. An object light beam P2 from the object 532 is guided to the camera module 510 and is formed into an image on the image sensor 512 by the lens 511.

The camera apparatus 500 of this embodiment simultaneously implements multi-degree-of-freedom driving of the camera module and achieves a reduction in the weight of the driven member including the camera module. It can therefore be expected to achieve speed-up and high accuracy. This can achieve both an improvement in the control characteristics of the visual line changing function of the camera apparatus and miniaturization/compactness of the camera apparatus.

In this embodiment, it suffices to rotationally move the driven member 110 with three rotational axes. Therefore, it suffices to use either the driving mechanism 200 or the driving mechanism 300 in place of the driving mechanism 400.

Sixth Embodiment

This embodiment is a camera apparatus using the driving mechanism 400 of the fourth embodiment. The arrangement of this camera apparatus will be described with reference to FIG. 28.

Figure 28:
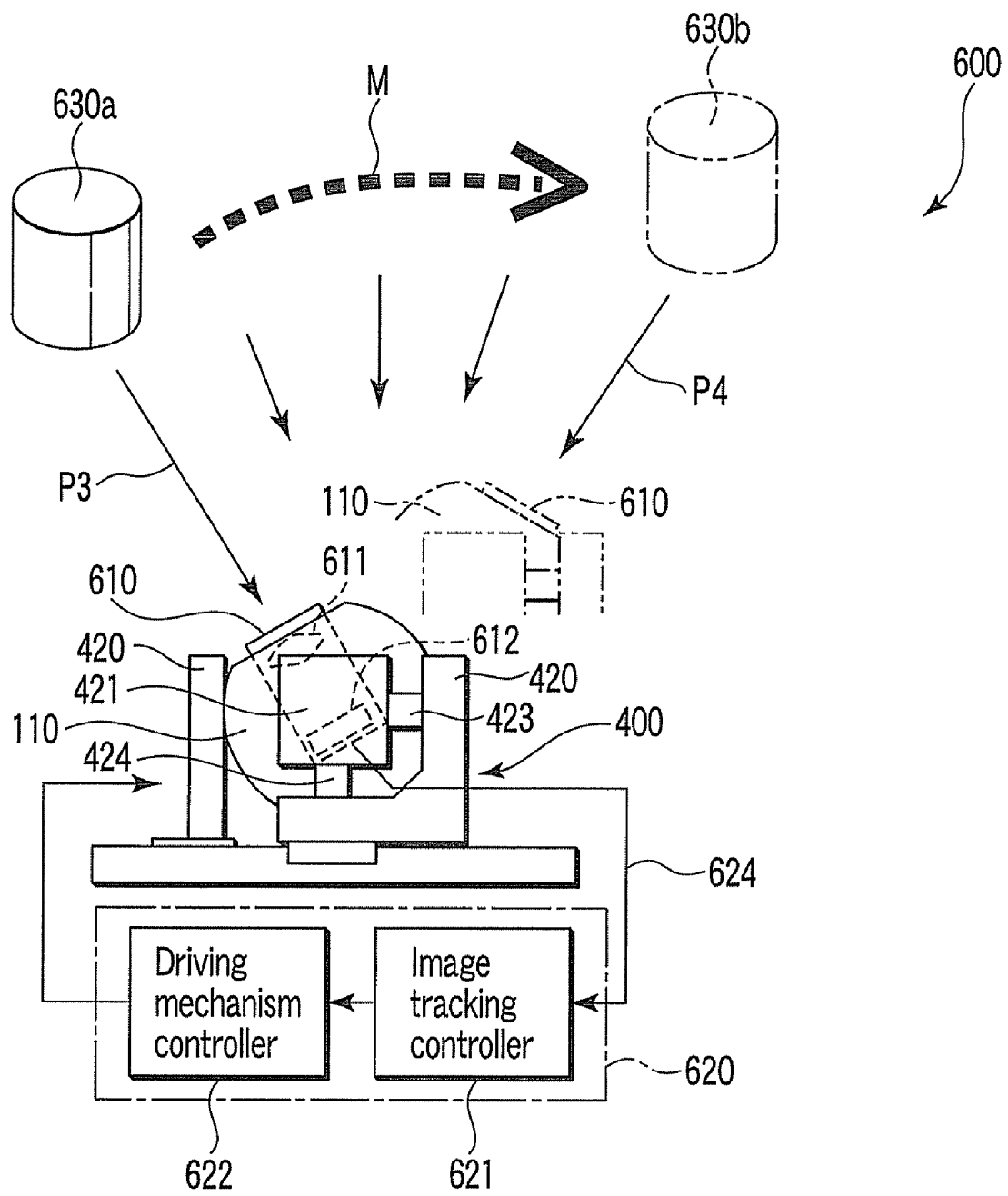
FIG. 28 is a view conceptually showing a camera apparatus according to the sixth embodiment.

As shown in FIG. 28, a camera apparatus 600 of this embodiment includes a driving mechanism 400, a camera module 610 mounted on a driven member 110 of the driving mechanism 400, and a controller 620 that controls piezoelectric units 420 of the driving mechanism 400. The camera module 610 includes a lens 611 that forms an object light beam p3 from an object 630a into an image and an image sensor 612 that acquires the formed optical image. The driving mechanism 400 can drive a driven member 110 with three rotational axes, and hence can freely change the visual line direction of the camera module 610. The controller 620 includes an image tracking controller 621 that generates an actuation signal for making the visual line direction of the camera module 610 track the object 630a and a driving mechanism controller 622 that controls the driving mechanism 400 on the basis of the manipulation signal generated by the image tracking controller 621. The controller 620 rotationally moves the driven member 110 to make the visual line direction of the camera module 610 follow the object 630a.

The camera module 610 takes an image of the object 630a. An object light beam P3 from the object 630a is guided to the camera module 610 and formed into an image on the image sensor 612 by the lens 611. The image tracking controller 621 obtains a moving state M of the object 630a on the basis of image information 624 captured by the image tracking controller 621, generates actuation signals for actuating piezoelectric elements 423 and 424 of the four piezoelectric units 420 in the driving mechanism 400 to make the visual line direction of the camera module 610 follow the object 630a, and outputs the signals to the driving mechanism controller 622. The driving mechanism controller 622 drives the driven member 110 by actuating the piezoelectric elements 423 and 424 of the piezoelectric units 420 of the driving mechanism 400 on the basis of the input actuation signals. As a result, the visual line direction of the camera module 610 moves while following the object 630a, and the camera module 610 takes an image of an object 630b after the movement. An object light beam P4 from the object 630b is guided to the camera module 610 and formed into an image on the image sensor 612 by the lens 611.

The camera apparatus 600 of this embodiment simultaneously implements multi-degree-of-freedom driving of the camera module and reduces the weight of the driven member including the camera module, and can be expected to achieve speed-up and high accuracy. This can achieve both an improvement in control characteristics of the image tracking function of the camera apparatus and miniaturization/compactness of the camera apparatus.

In this embodiment, it suffices to rotationally move the driven member 110 with three rotational axes. Therefore, it suffices to use either the driving mechanism 200 or the driving mechanism 300 in place of the driving mechanism 400.

Seventh Embodiment

This embodiment is a camera apparatus using the driving mechanism 400 of the fourth embodiment. The arrangement of this camera apparatus will be described with reference to FIG. 29.

Figure 29:
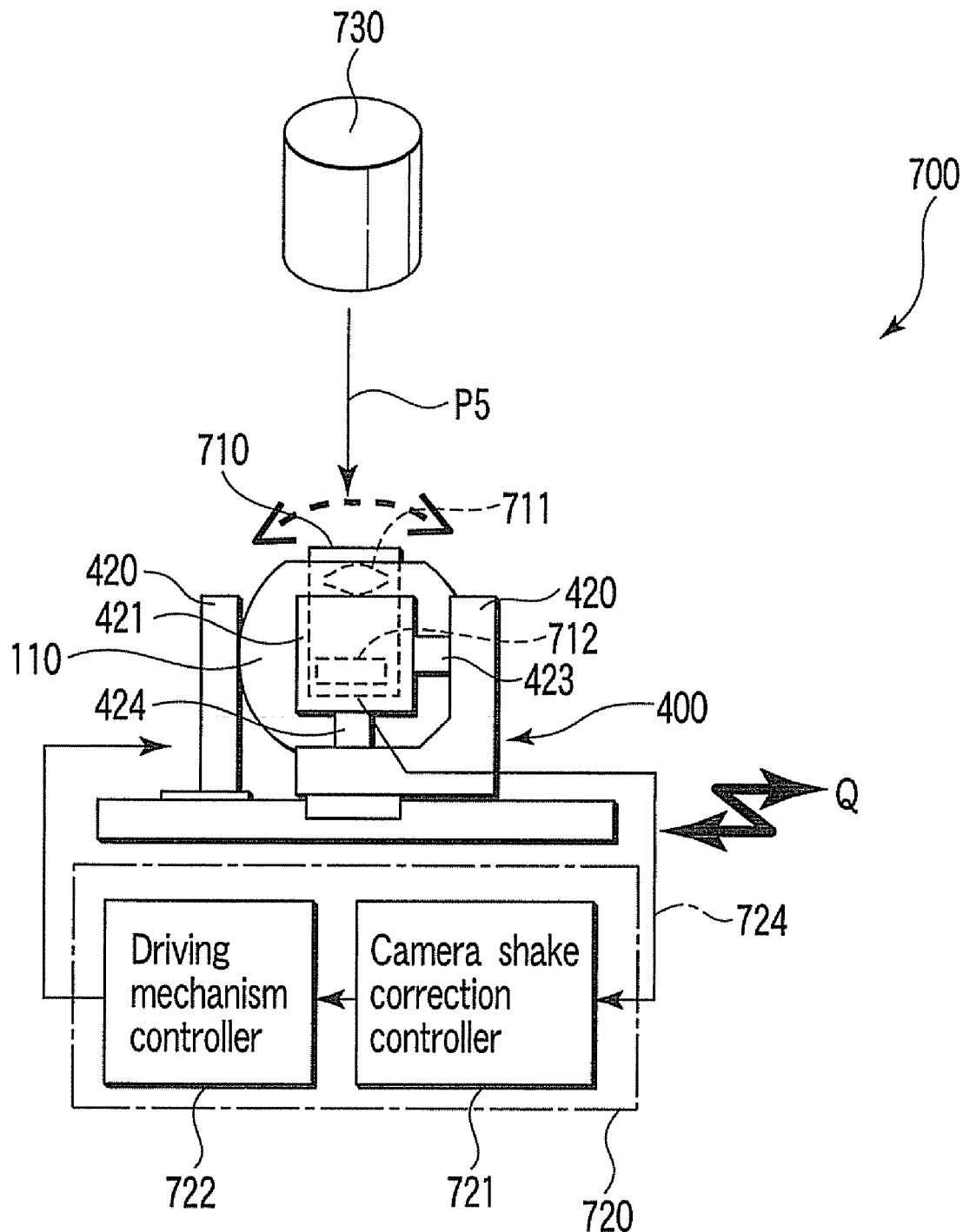
FIG. 29 is a view conceptually showing a camera apparatus according to the seventh embodiment.

As shown in FIG. 29, a camera apparatus 700 of this embodiment includes a driving mechanism 400, a camera module 710 mounted on a driven member 110 of the driving mechanism 400, and a controller 720 that controls piezoelectric units 420 of the driving mechanism 400. The camera module 710 includes a lens 711 that forms an object light beam from an object 730 into an image and an image sensor 712 that acquires the formed optical image. The driving mechanism 400 can drive the driven member 110 with two translational axes, and hence can change the positions of the camera module 710 in the vertical and horizontal directions. The controller 720 includes a camera shake correction controller 721 that generates an actuation signal for correcting camera shake and a driving mechanism controller 722 that controls the driving mechanism 400 on the basis of the actuation signal generated by the camera shake correction controller 721, and straightly moves the camera module 710 in the vertical and horizontal directions by linearly moving the driven member 110.

The camera module 710 takes an image of an object 730. An object light beam P5 from the object 730 is guided to the camera module 710 and formed into an image on the image sensor 712 by the lens 711. The camera shake correction controller 721 obtains an image blur state Q of the object 730 on the basis of captured image information 724, generates actuation signals for actuating piezoelectric elements 423 and 424 of the piezoelectric units 420 of the driving mechanism 400 to cancel camera shake by driving the camera module 710 in the vertical and horizontal directions, and outputs the signals to the driving mechanism controller 722. The driving mechanism controller 722 drives the driven member 110 by actuating the piezoelectric elements 423 and 424 of the piezoelectric units 420 on the basis of the input actuation signals. As a result, the camera module 710 obtains a clear image with little image blur due to camera shake. In this case, actuation signals for canceling camera shake are obtained by obtaining the image blur state Q using the image information 724. However, it suffices to separately provide the main body of the camera apparatus 700 with a sensor that measures camera shake and obtain actuation signals for canceling camera shake on the basis of information obtained by the sensor. In addition, it suffices to obtain actuation signals for canceling camera shake on the basis of both the image information 724 and the information obtained by the sensor that measures camera shake.

The camera apparatus 700 of this embodiment simultaneously implements multi-degree-of-freedom driving of the camera module and reduces the weight of the driven member including the camera module, and can be expected to achieve speed-up and high accuracy. This can achieve both an improvement in the control characteristics of the camera shake correction function of the camera apparatus and miniaturization/compactness of the camera apparatus.

Eighth Embodiment

This embodiment is a camera apparatus using the driving mechanism 400 of the fourth embodiment. The arrangement of this camera apparatus will be described with reference to FIG. 30.

Figure 30:
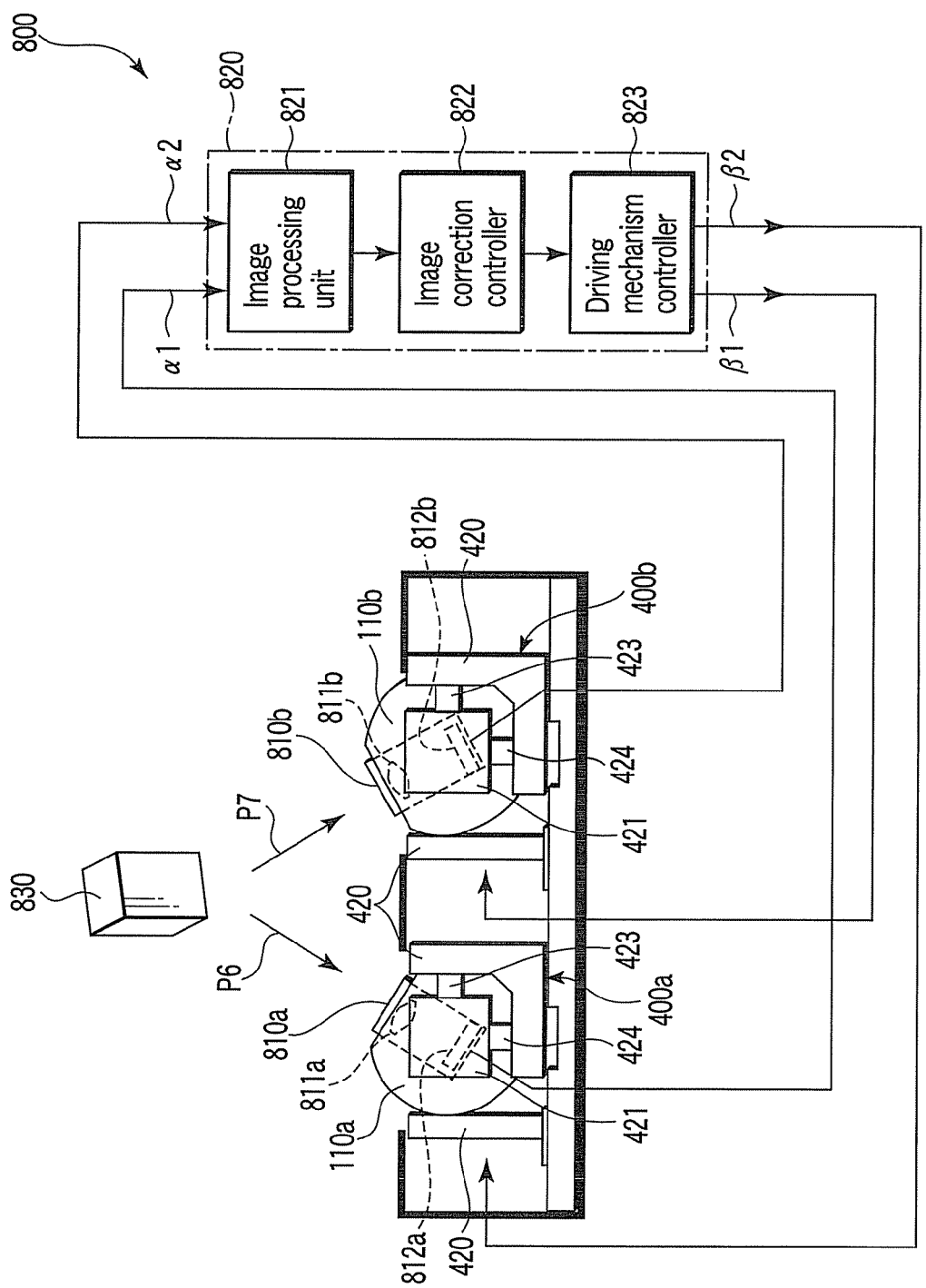
FIG. 30 is a view conceptually showing a camera apparatus according to the eighth embodiment.

As shown in FIG. 30, a camera apparatus 800 of this embodiment includes two driving mechanisms 400a and 400b placed at a predetermined interval, two camera modules 810a and 810b respectively mounted on driven members 110a and 110b of the driving mechanisms 400a and 400b, and a controller 820 that controls piezoelectric units 420 of the driving mechanisms 400a and 400b. The camera modules 810a and 810b respectively include lenses 811a and 811b that form object light beams from an object 830 into images, and image sensors 812a and 812b that acquire the formed optical images. The driving mechanisms 400a and 400b can respectively drive the driven members 110a and 110b with three rotational axes, and hence can freely change the visual line directions of the camera modules 810a and 810b. The controller 820 includes an image processing unit 821 that generates a stereoscopic image from images from the image sensors 812a and 812b, an image correction controller 822 that generates actuation signals for finely adjusting the visual line directions of the camera modules 810a and 810b, and a driving mechanism controller 823 that controls the driving mechanisms 400a and 400b on the basis of the actuation signals generated by the image correction controller 822. The controller 820 finely adjusts the visual line directions of the camera modules 810a and 810b so as to provide a proper stereoscopic image to an observer by rotating/moving the driven member 110.

The two camera modules 810a and 810b placed side by side take images of the object 830. An object light beam P6 from the object 830 is guided to the camera module 810a and formed into an image on the image sensor 812a by the lens 811a. An object light beam P7 from the object 830 is guided to the camera module 810b and formed into an image on the image sensor 812b by the lens 811b. The image processing unit 821 generates a stereoscopic image on the basis of images α1 and α2 input from the image sensors 812a and 812b. More specifically, a stereoscopic image is obtained from the images α1 and α2 from two directions having a parallax in the horizontal direction. The image correction controller 822 analyzes the stereoscopic image obtained by the image processing unit 821, generates actuation signals for fine adjustment to provide a proper stereoscopic image to an observer, and outputs the signals to the driving mechanism controller 823. Fine adjustment includes not only fine adjustment in the horizontal direction but also fine adjustment of shifts caused by zooming operation, focus adjustment, and the like of the camera modules 810a and 810b. For fine adjustment, for example, one visual line direction of each of the camera modules 810a and 810b is changed within the vertical plane and the other visual line direction of each of the camera modules 810a and 810b is changed within the horizontal plane by rotating/moving the driven members 110a and 110b. In addition, one of the camera modules 810a and 810b is linearly moved in the vertical direction and the other of the camera modules 810a and 810b is linearly moved in the horizontal direction by linearly moving the driven members 110a and 110b. Obviously, it suffices to change both the visual line directions of the camera modules 810a and 810b within the vertical and horizontal planes and linearly move both the camera modules 810a and 810b in the vertical and horizontal directions. Actuation signals are signals for actuating piezoelectric elements 423 and 424 of the four piezoelectric units 420 of the driving mechanisms 400a and 400b. The driving mechanism controller 823 generates output signals P1 and P2 that actuate the piezoelectric elements 423 and 424 of the piezoelectric units 420 on the basis of the input actuation signals, and outputs the signals to the driving mechanisms 400a and 400b, thereby driving the driven members 110a and 110b. As a result, parallax adjustment and shift correction in the vertical direction are executed at high speed with high accuracy.

The camera apparatus 800 of this embodiment executes parallax adjustment associated with stereoscopic images from two directions having a parallax in the horizontal direction and shift correction in the vertical direction at high speed with high accuracy, thereby always providing good stereoscopic images. In addition, this can be expected to achieve miniaturization and compactness of the overall camera apparatus as compared with a conventional arrangement using a pan-tilt mechanism.

Ninth Embodiment

This embodiment is a holographic recording apparatus using the driving mechanism 400 of the fourth embodiment. The arrangement of this holographic recording apparatus will be described with reference to FIG. 31.

Figure 31:
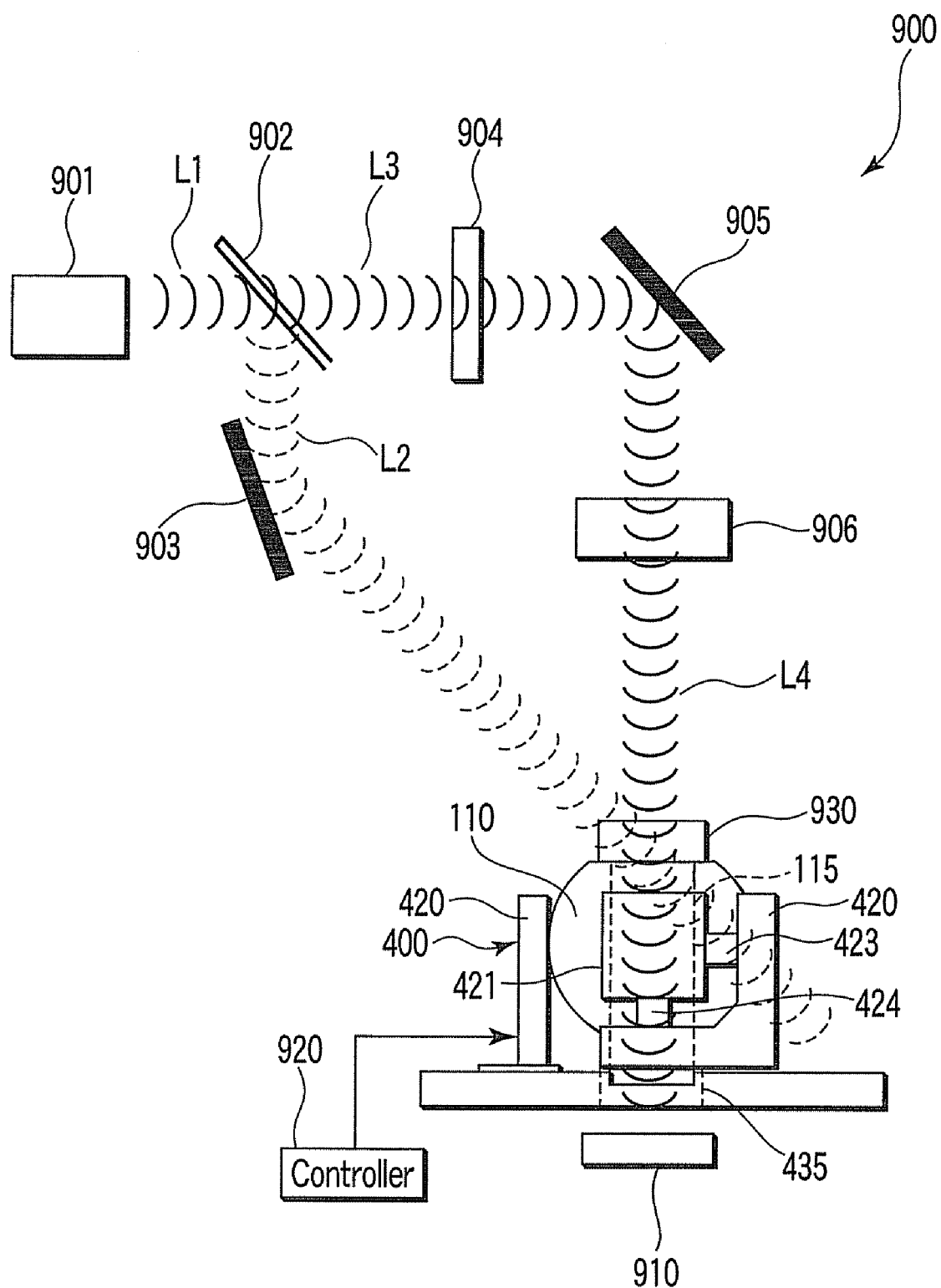
FIG. 31 is a view conceptually showing a holographic recording apparatus according to the ninth embodiment.

As shown in FIG. 31, a holographic recording apparatus 900 of this embodiment is an apparatus that records an optical interference fringe pattern on a recording medium and plays it back. This apparatus includes a driving mechanism 400, an optical system that forms an interference fringe pattern of reference light and signal light containing recording information on a recording medium 930 held on a driven member 110 of the driving mechanism 400, and a controller 920 that controls piezoelectric units 420 of the driving mechanism 400. The optical system includes a light source 901, a beam splitter 902 that splits a light beam L1 from the light source 901 into two light beams L2 and L3, a mirror 903 that directs the light beam L2 reflected by the beam splitter 902 as a reference light beam to the recording medium 930, a shutter 904 that properly shuts off the light beam L3 transmitted through the beam splitter 902, a mirror 905 that directs the light beam L3 transmitted through the shutter 904 to the recording medium 930, and a spatial light modulator 906 that generates a signal light beam L4 by superimposing recording information on the light beam L3. The controller 920 adjusts the position and posture of the recording medium 930 with respect to an interference fringe pattern by rotating/moving and linearly moving the driven member 110. The driving mechanism 400 can drive the driven member 110 with a total of six axes, i.e., three translational axes and three rotational axes, and is suitable for the adjustment of the position and posture of the recording medium 930. The driven member 110 and a base 430 of the driving mechanism 400 respectively have a through hole 115 and an opening 435 that allow the signal light beam L4 to pass through them. The holographic recording apparatus 900 further includes a photodetector 910 for playback.

At the time of recording, the controller 920 controls the driving mechanism 400 to drive the driven member 110, thereby adjusting the recording medium 930 to a desired position and posture (angle). In adjusting the position and posture (angle), the operator or the like has already input instruction information to the controller 920. The beam splitter 902 splits the light beam L1 from the light source 901 into the two light beams L2 and L3. The light beam L2 is reflected by the mirror 905 and is guided, as reference light, to the recording medium 930. The light beam L3 passes through the shutter 904 and is reflected by the mirror 905. The spatial light modulator 906 then superimposes recording information on the light beam L3 to generate the signal light beam L4. The signal light beam L4 is then guided to the recording medium 930. The reference light beam L2 and the signal light beam L4 generate an interference fringe pattern. The interference fringe pattern is recorded on the recording medium 930. The incident angle of the reference light beam L2 relative to the signal light beam L4 is adjusted in advance to a desired angle at which information can be recorded on the recording medium 930 by using the light interference fringe pattern.

At the time of playback, the shutter 904 is shut, and the driving mechanism 400 is controlled to drive the driven member 110, thereby adjusting the recording medium 930 to a desired position and posture (angle) at which information in the information recording area is to be played back. When the reference light beam L2 is guided to the recording medium 930, the reference light beam changes on the basis of the information recorded on the recording medium 930 in advance. The photodetector 910 detects this changed light. The signal detected by the photodetector 910 is reproduced into the original information through a predetermined procedure.

In general, multiplexed recording methods used by a holographic recording apparatus include an angle-multiplexed recording method of recording information while changing the posture (angle) of the recording medium 930, and a shift-multiplexed recording method of recording information while moving the position of the recording medium 930. In order to increase the capacity of recording information by this multiplexed recording method, it is strongly required to improve the function and performance of a driving mechanism that drives the recording medium 930. That is, it is required to simultaneously satisfy the requirement for multi-degree-of-freedom driving of the recording medium 930 and the requirement for high accuracy, speed-up, miniaturization, and compactness of the driving mechanism.

The holographic recording apparatus 900 of this embodiment simultaneously implements multi-degree-of-freedom driving of the recording medium 930 and reduces the weight of the driven member 110 including the recording medium 930, and hence can be expected to achieve speed-up and high accuracy. This greatly improves driving controllability associated with multiplexed recording and playback of the holographic recording apparatus. It can therefore be expected to increase the capacity of multiplexed recording and data transfer rate. In addition, this can achieve miniaturization and compactness of the overall holographic recording apparatus.

This embodiment has been described by using only main constituent elements such as the light source 901 and the spatial light modulator 906. However, an actual holographic recording apparatus additionally uses constituent elements necessary for general optical design such as lenses and polarizing plates, as needed.

Although the embodiments of the present invention have been described with reference to the views of the accompanying drawing, the present invention is not limited to the embodiments. These embodiments may be variously modified and embodied within the spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A driving mechanism comprising:
a driven member partially having a spherical surface;
piezoelectric units that support the driven member therebetween and drive the driven member, each of the piezoelectric units including a driving portion that has a flat surface in contact with the spherical surface of the driven member and performs quick linear movement and slow linear movement, a first piezoelectric element that moves the driving portion along a first axis parallel to the flat surface, a second piezoelectric element that moves the driving portion along a second axis that is parallel to the flat surface and intersects the first axis, and a support member that supports the driving portion through the first piezoelectric element and the second piezoelectric element; and
a base that holds the piezoelectric units.

2. The mechanism according to claim 1, wherein the piezoelectric units comprise two piezoelectric units and are arranged so that the driving portions face each other through the driven member and the flat surfaces of the driving portions are parallel to each other.

3. The mechanism according to claim 2, wherein the support members are fixed on the base so that a distance between the driving portions is smaller than a diameter of the spherical surface, and the driven member is supported by elastic deformation of the piezoelectric units.

4. The mechanism according to claim 2, further comprising a controller that controls the piezoelectric units, wherein the controller
actuates the first piezoelectric elements so as to cause the driving portions to perform quick linear movement and slow linear movement along the first axis in opposite directions and perform the linear movement in synchronism with each other along the first axis in the same direction, so that the driven member is linearly moved along the first axis,
actuates the second piezoelectric elements so as to cause the driving portions to perform quick linear movement and slow linear movement along the second axis in opposite directions and perform the linear movement in synchronism with each other along the first axis in the same direction, so that the driven member is linearly moved along the second axis, actuates the first piezoelectric elements so as to cause the driving portions to perform quick linear movement and slow linear movement along the first axis in opposite directions and perform the linear movement in synchronism with each other along the first axis in opposite directions, so that the driven member is rotationally moved about an axis that passes through a center of the spherical surface and is parallel to the second axis, and actuates the second piezoelectric elements so as to cause the driving portions to perform quick linear movement and slow linear movement along the second axis in opposite directions and perform the linear movement in synchronism with each other along the first axis in opposite directions, so that the driven member is rotationally moved about an axis that passes through the center of the spherical surface and is parallel to the first axis.

5. The mechanism according to claim 1, wherein the piezoelectric units comprise three piezoelectric units and are arranged so that the driving portions surround the driven member.

6. The mechanism according to claim 5, wherein the support members are fixed on the base so that the driving portions are located on a circumference smaller than a great circle, which is a circle on a cut surface obtained by cutting the spherical surface with a plane passing through the center of the spherical surface, and the driven member is supported by elastic deformation of the piezoelectric units.

7. The mechanism according to claim 5, further comprising a controller that controls the piezoelectric units, wherein the controller actuates the second piezoelectric elements so as to cause the driving portions to perform quick linear movement and slow linear movement along the second axis in opposite directions and perform the linear movement in synchronism with each other along the second axis in the same direction, so that the driven member is linearly moved along the second axis, actuates the first piezoelectric elements so as to cause the driving portions to perform quick linear movement and slow linear movement along the first axis in opposite directions and perform the linear movement in synchronism with each other in the same direction with respect to rotation about an axis that passes through the center of the spherical surface and is parallel to the second axis, so that the driven member is rotationally moved about an axis that passes through the center of the spherical surface and is parallel to the second axis, and selectively actuates the second piezoelectric elements so as to cause the driving portions to perform quick linear movement and slow linear movement along the second axis in opposite directions, so that the driven member is rotationally moved about an axis that passes through the center of the spherical surface and is perpendicular to the second axis.

8. The mechanism according to claim 1, wherein the piezoelectric units comprise four piezoelectric units, the four piezoelectric units form a first unit group including two of the four piezoelectric units and a second unit group including the remaining two piezoelectric units, the piezoelectric units of each of the first unit group and the second unit group are arranged so that the driving portions face each other through the driven member and the flat surfaces of the driving portions are parallel to each other, and the flat surfaces of the driving portions of the first unit group are perpendicular to the flat surfaces of the driving portions of the second unit group.

9. The mechanism according to claim 8, wherein the support members of each of the first unit group and second unit group are fixed on the base so that a distance between the driving portions is smaller than a diameter of the spherical surface, and the driven member is supported by elastic deformation of the piezoelectric units.

10. The mechanism according to claim 8, further comprising a controller that controls the piezoelectric units, wherein the controller actuates the second piezoelectric elements so as to cause the driving portions of all the piezoelectric units to perform quick linear movement and slow linear movement along the second axis in opposite directions and perform the linear movement in synchronism with each other along the second axis in the same direction, so that the driven member is linearly moved along the second axis, actuates the first piezoelectric elements so as to cause the driving portions of all the piezoelectric units to perform quick linear movement and slow linear movement along the first axis in opposite directions and perform the linear movement in synchronism with each other in the same direction with respect to rotation about an axis that passes through the center of the spherical surface and is parallel to the second axis, so that the driven member is rotationally moved about an axis that passes through the center of the spherical surface and is parallel to the second axis, actuates the second piezoelectric elements so as to cause the driving portions of the first unit group to perform quick linear movement and slow linear movement along the second axis in opposite directions and perform the linear movement in synchronism with each other in the same direction with respect to rotation about an axis that passes through the center of the spherical surface and is parallel to the first axis, so that the driven member is rotationally moved about an axis that passes through the center of the spherical surface and is parallel to the first axis, and actuates the second piezoelectric elements so as to cause the driving portions of the second unit group to perform quick linear movement and slow linear movement along the second axis in opposite directions and perform the linear movement in synchronism with each other in the same direction with respect to rotation about an axis that passes through the center of the spherical surface and is parallel to the first axis, so that the driven member is rotationally moved about an axis that passes through the center of the spherical surface and is parallel to the first axis.

11. The mechanism according to claim 8, wherein each of the piezoelectric units further includes a linear guide portion that is linearly movably supported on the base, and the base further includes a guide bearing portion that accommodates the linear guide portion and allows linear movement of the linear guide portion.

12. The mechanism according to claim 11, wherein each of the first unit group and the second unit group further includes a coupling portion that couples the support members to each other so that a distance between the driving portions is slightly smaller than a diameter of the spherical surface, and the driven member is supported by elastic deformation of the piezoelectric units.

13. The mechanism according to claim 11, wherein each of the first unit group and the second unit group further includes a biasing member that biases the piezoelectric unit to bring the driving portions close to each other through the driven member, and the driven member is supported on the piezoelectric unit by biasing force of the biasing member.

14. A camera apparatus comprising:
a driving mechanism including
a driven member partially having a spherical surface,
four piezoelectric units that support the driven member therebetween and drive the driven member,
each of the piezoelectric units including a driving portion that has a flat surface in contact with the spherical surface of the driven member and performs quick linear movement and slow linear movement, a first piezoelectric element that moves the driving portion along a first axis parallel to the flat surface, a second piezoelectric element that moves the driving portion along a second axis that is parallel to the flat surface and intersects the first axis, and a support member that supports the driving portion through the first piezoelectric element and the second piezoelectric element,
the four piezoelectric units forming a first unit group including two of the four piezoelectric units and a second unit group including the remaining two piezoelectric units, the piezoelectric units of each of the first unit group and the second unit group being arranged so that the driving portions face each other through the driven member and the flat surfaces of the driving portions are parallel to each other, and the flat surfaces of the driving portions of the first unit group are perpendicular to the flat surfaces of the driving portions of the second unit group, and
a base that holds the piezoelectric units;
a camera module that is mounted on the driven member of the driving mechanism and takes an image of an object; and
a controller that controls the piezoelectric units of the driving mechanism.

15. A holographic recording apparatus that records an optical interference fringe pattern on a recording medium and plays back the pattern, the apparatus comprising:
a driving mechanism including
a driven member that partially has a spherical surface and holds the recording medium,
four piezoelectric units that support the driven member therebetween and drive the driven member,
each of the four piezoelectric units including a driving portion having a flat surface in contact with the spherical surface of the driven member, a first piezoelectric element that moves the driving portion along a first axis parallel to the flat surface, a second piezoelectric element that moves the driving portion along a second axis that is parallel to the flat surface and intersects the first axis, a support member that supports the driving portion through the first piezoelectric element and the second piezoelectric element, and a linear guide portion that linearly movably supports the support member on the base,
the four piezoelectric units forming a first unit group including two of the four piezoelectric units and a second unit group including the remaining two piezoelectric units, the piezoelectric units of each of the first unit group and the second unit group being arranged so that the driving portions face each other through the driven member and the flat surfaces of the driving portions are parallel to each other, and the flat surfaces of the driving portions of the first unit group are perpendicular to the flat surfaces of the driving portions of the second unit group, and
a base that holds the piezoelectric units and includes a guide bearing portion that accommodates the linear guide portion and allows linear movement of the linear guide portion;
an optical system that forms an interference fringe pattern of reference light and signal light containing recording information on the recording medium; and
a controller that controls the piezoelectric units.

* * * * *

UNITED STATES PATENT AND TRADEMARK OFFICE
CERTIFICATE OF CORRECTION

PATENT NO. : 7,832,947 B2
APPLICATION NO. : 12/051099
DATED : November 16, 2010
INVENTOR(S) : Hiroshi Takahashi It is certified that error appears in the above-identified patent and that said Letters Patent is hereby corrected as shown below:

The error occurs in the patent on the Title page item (73) Assignees: Kabushiki Kaisha Toshiba, Tokyo (JP); Toshiba Tec Kabushiki Kaisha, Tokyo (JP)

It should read:

(73) Assignee: Kabushiki Kaisha Toshiba, Tokyo (JP)

Signed and Sealed this
Fifteenth Day of February, 2011

David J. Kappos
*Director of the United States Patent and Trademark Office*